(12) United States Patent
Da Silva et al.

(10) Patent No.: US 11,424,878 B2
(45) Date of Patent: Aug. 23, 2022

(54) RADIO LINK MONITORING/RADIO LINK FAILURE RECONFIGURATION UPON BANDWIDTH PARTS SWITCHING

(71) Applicant: TELEFONAKTIEBOLAGET LM ERICSSON (PUBL), Stockholm (SE)

(72) Inventors: Icaro L. J. Da Silva, Solna (SE); Helka-Liina Määttanen, Helsinki (FI); Iana Siomina, Täby (SE); Muhammad Kazmi, Sundbyberg (SE); Rui Fan, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 42 days.

(21) Appl. No.: 16/757,966

(22) PCT Filed: Nov. 14, 2018

(86) PCT No.: PCT/IB2018/058975
§ 371 (c)(1),
(2) Date: Apr. 21, 2020

(87) PCT Pub. No.: WO2019/097432
PCT Pub. Date: May 23, 2019

(65) Prior Publication Data
US 2020/0344019 A1    Oct. 29, 2020

Related U.S. Application Data

(60) Provisional application No. 62/587,360, filed on Nov. 16, 2017.

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0626* (2013.01); *H04L 1/0026* (2013.01);
(Continued)

(58) Field of Classification Search
CPC ...... H04B 7/00; H04B 7/0491; H04B 7/0495; H04B 7/0626; H04L 1/0026;
(Continued)

(56) References Cited

U.S. PATENT DOCUMENTS 8,995,366 B2   3/2015   Nimbalker et al.
9,173,109 B2   10/2015  Xu et al.
(Continued)

FOREIGN PATENT DOCUMENTS

CN   105934973 A   9/2016
JP   2013526158 A  6/2013
(Continued)

OTHER PUBLICATIONS

Vivo, "RLM / RLF in NR", 3GPP TSG-RAN WG2 Meeting #99bis, Prague, Czech Republic, Oct. 9-13, 2017, pp. 1-3, R2-1710919, 3GPP.
(Continued)

*Primary Examiner* — Michael Thier
*Assistant Examiner* — Prince A Mensah

(57) ABSTRACT

A method in a user equipment (UE) is disclosed. The method comprises obtaining one or more radio link monitoring configurations, each radio link monitoring configuration associated with at least one bandwidth part. The method comprises determining that the UE is to switch from a source bandwidth part to a target bandwidth part. The method comprises performing radio link monitoring on the target bandwidth part according to an obtained radio link monitoring configuration associated with the target bandwidth part.

24 Claims, 16 Drawing Sheets

(51) Int. Cl.
　　*H04L 1/00*　　(2006.01)
　　*H04L 1/18*　　(2006.01)
　　*H04L 1/20*　　(2006.01)
　　*H04W 24/04*　(2009.01)
　　*H04W 24/10*　(2009.01)

(52) U.S. Cl.
　　CPC ............ *H04L 1/1851* (2013.01); *H04L 1/203* (2013.01); *H04W 24/04* (2013.01); *H04W 24/10* (2013.01)

(58) Field of Classification Search
　　CPC ......... H04L 1/1851; H04L 1/20; H04L 1/203; H04W 24/00; H04W 24/04; H04W 24/10
　　See application file for complete search history.

(56) References Cited

U.S. PATENT DOCUMENTS

| | | | |
|---|---|---|---|
| 2014/0043988 A1* | 2/2014 | Chen | H04L 1/0026 370/252 |
| 2015/0271763 A1* | 9/2015 | Balachandran | H04B 17/23 370/338 |
| 2019/0052377 A1* | 2/2019 | Hwang | H04B 17/309 |
| 2019/0182000 A1* | 6/2019 | Futaki | H04L 5/0092 |
| 2020/0260303 A1* | 8/2020 | Chen | H04L 5/0091 |
| 2020/0274679 A1* | 8/2020 | Futaki | H04L 5/0092 |

FOREIGN PATENT DOCUMENTS

| | | |
|---|---|---|
| KR | 20150041007 A | 4/2015 |
| RU | 2016113845 A | 10/2017 |
| WO | 2011130665 A1 | 10/2011 |
| WO | 2014025380 A1 | 2/2014 |

OTHER PUBLICATIONS

Ericsson, "BWP impact to RLM configuration (E396)", 3GPP TSG-RAN WG2 #101, Athens, Greece, Feb. 26-Mar. 2, 2018, pp. 1-4, R2-1802780, 3GPP.

Intel Corporation, "RLM and RLF", 3GPP TSG-RAN WG2 Meeting #99bis, Prague, Czech Republic, Oct. 9-13, 2017, pp. 1-4, R2-1710625, 3GPP.

Samsung, "RLM/RLF for bandwidth part", 3GPP TSG-RAN WG2 Meeting #99bis, Prague, Czech Republic, Oct. 9-13, 2017, pp. 1-3, R2-1711404, 3GPP.

Samsung, "NR RLM and RLF procedure", 3GPP TSG-RAN WG2 Meeting #99bis, Prague, Czech Republic, Oct. 9-13, 2017, pp. 1-3, R2-1711414, 3GPP.

Samsung, "The Impact of Bandwidth Part on RAN2: Overview and Issues", 3GPP TSG RAN WG2 #99bis, Prague, Czech Republic, Oct. 9-13, 2017, pp. 1-8, R2-1711595, 3GPP.

* cited by examiner

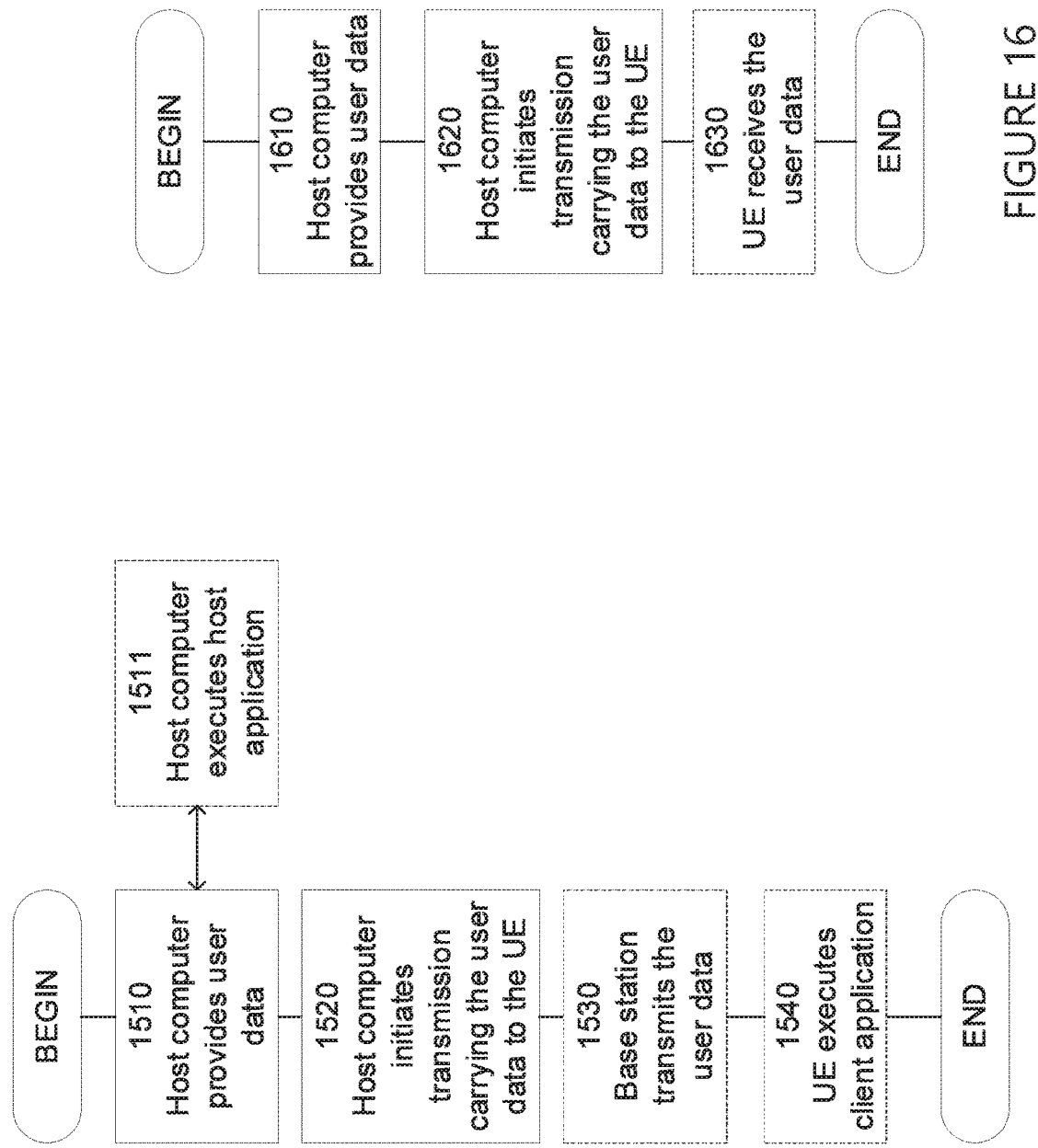

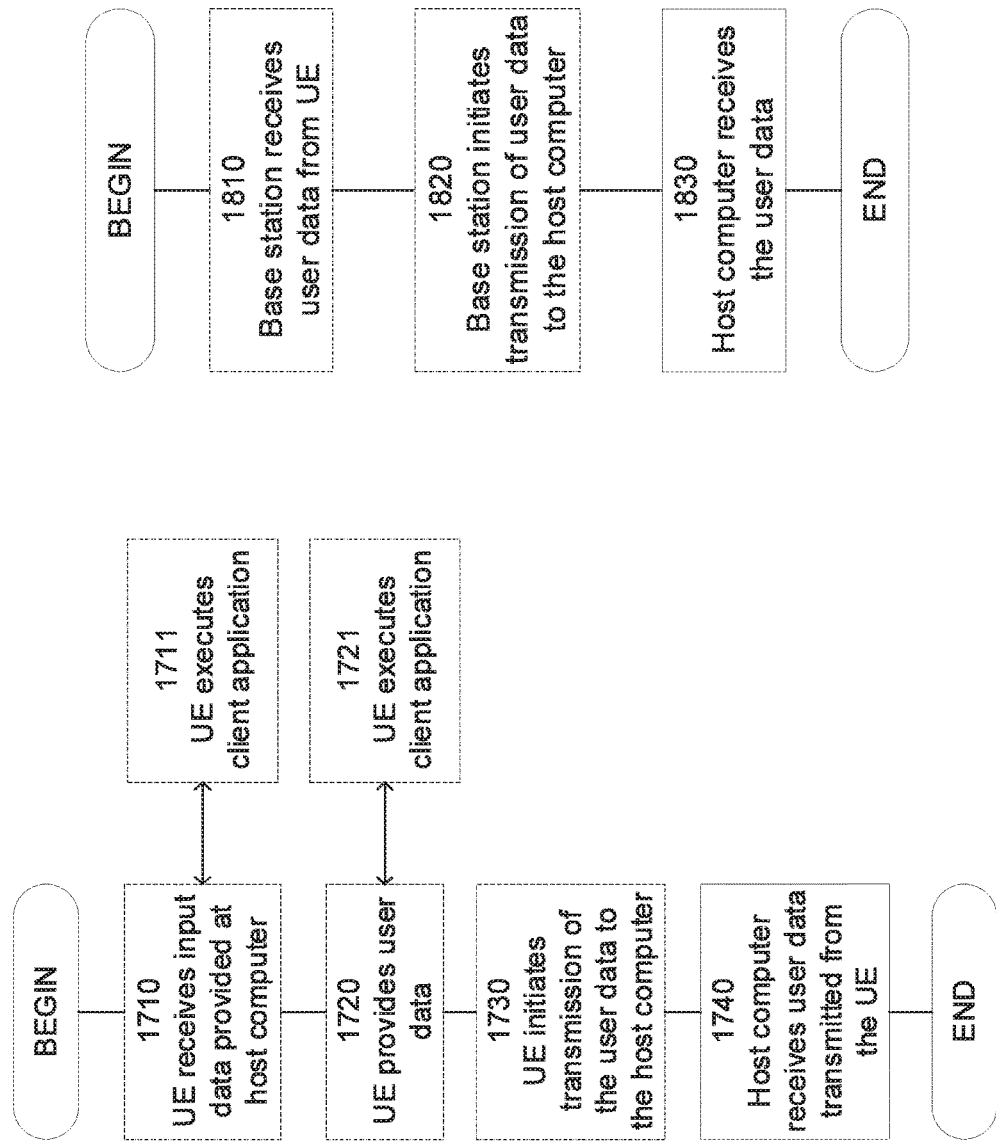

RADIO LINK MONITORING/RADIO LINK FAILURE RECONFIGURATION UPON BANDWIDTH PARTS SWITCHING

RELATED APPLICATIONS

The present application is a 371 of International Application No. PCT/IB2018/058975, filed Nov. 14, 2018, which claims the benefit of and priority to U.S. Provisional Patent Application No. 62/587,360, filed Nov. 16, 2017, entitled "CONFIGURATION UPON BANDWIDTH PARTS SWITCHING," the disclosures of which are hereby incorporated herein by reference in their entirety.

TECHNICAL FIELD

The present disclosure relates, in general, to wireless communications and, more particularly, to providing optimizations for reduced transmit power control frequency operation.

BACKGROUND

In Radio Link Monitoring (RLM) handling in Long Term Evolution (LTE), the key question is how the user equipment (UE) generate In Synch (IS) and Out-of-Sync (OOS) events. One purpose of the RLM function in the UE is to monitor the downlink (DL) radio link quality of the serving cell in RRC_CONNECTED state. It is based on the Cell-Specific Reference Signals (CRS), which are associated to a given LTE cell and are derived from the Physical Cell Identifier (PCI). When in the RRC_CONNECTED state, this enables the UE to determine whether it is in-sync or out-of-sync with respect to its serving cell.

The UE's estimate of the DL radio link quality is compared with OOS and IS thresholds (Qout and Qin, respectively) for the purpose of RLM. These thresholds are expressed in terms of the Block Error Rate (BLER) of a hypothetical Physical Downlink Control Channel (PDCCH) transmission from the serving cell. Specifically, Qout corresponds to a 10% BLER while Qin corresponds to a 2% BLER. The same threshold levels are applicable with and without discontinuous reception (DRX).

The mapping between the CRS based DL quality and the hypothetical PDCCH BLER depends on the UE implementation. However, the performance is verified by conformance tests defined for various environments. Additionally, the DL quality is calculated based on the reference signal received power (RSRP) of CRS over the whole band, since UE does not necessarily know where PDCCH is going to be scheduled. This is because PDDCH can be scheduled anywhere over the whole DL transmission bandwidth, as described with respect to FIG. 1 below.

FIG. 1 illustrates an example of how PDCCH can be scheduled over the whole DL transmission bandwidth. More particularly, FIG. 1 illustrates a plurality of radio frames 10, each having a duration of 10 ns. Each radio frame 10 is made up of ten subframes 15, each subframe 15 having a duration of 1 ms. A UE performs one sample per radio frame 10 for RLM. As noted above, the DL quality is calculated based on the RSRP of CRS over the whole band since the UE does not necessarily know where PDCCH is going to be scheduled.

When no DRX is configured, OOS occurs when the DL radio link quality estimated over the last 200 ms period becomes worse than the threshold Qout. Similarly, without DRX IS occurs when the DL radio link quality estimated over the last 100 ms period becomes better than the threshold Qin. Upon detection of OOS, the UE initiates the evaluation of IS.

In Radio Link Failure (RLF) modeling in LTE, the key question is how the higher layers use the internally generated IS/OOS events from RLM to control the UE autonomous actions when it detects that is cannot be reached by the network while in RRC_CONNECTED. In LTE, the occurrences of OOS and IS events are reported internally by the UE's physical layer to its higher layers, which in turn may apply radio resource control (RRC)/layer 3 (i.e., higher layer) filtering for the evaluation of RLF as described in more detail in relation to FIG. 2 below.

FIG. 2 illustrates an example procedure for evaluating RLF. At step 201, the UE detects a first OOS event. At step 203, the UE detects up to N310 consecutive out of sync events and starts timer T310 (as described in the RRC specification 3GPP TS 38.331, portions of which are excerpted below). At step 205, timer T310 expires, and RLF occurs. The UE transmitter is then turned off within 40 ms, and the RRC re-establishment procedure starts. The UE starts timer T311, and the UE searches for the best cell. At step 207, the UE selects a target (i.e., best) cell. At step 209, the UE acquires system information (SI) for the target cell and sends a random access channel (RACH) preamble to the target cell. At step 211, the UE acquires an UL grant and sends an RRC connection reestablishment request message.

As noted above, the detailed UE actions related to RLF are captured in the RRC specifications (3GPP TS 38.331). A portion of 3GPP TS 38.331 is excerpted below:

---

5.2.2.9 Actions upon reception of *SystemInformationBlockType2*
Upon receiving *SystemInformationBlockType2*, the UE shall:
  1> apply the configuration included in the
*radioResourceConfigCommon*;
. . .
  1> if in RRC_CONNECTED and UE is configured with RLF timers
and constants values received within *rlf-TimersAndConstants*:
    2> not update its values of the timers and constants in *ue-TimersAntiConstants* except for the value of timer T300;
. . .
5.3.10 Radio resource configuration
5.3.10.0 General
The UE shall:
. . .
  1> if the received *radioResourceConfigDedicated* includes the *rlf-TimersAndConstants*:
    2> reconfigure the values of timers and constants as
specified in 5.3.10.7;
. . .

5.3.10.7 Radio Link Failure Timers and Constants reconfiguration
The UE shall:
1> if the received *rlf-TimersAndConstants* is set to release:
  2> use values for timers T301, T310, T311 and constants N310, N311, as included in *ue-TimersAndConstants* received in *SystemInformationBlockType2* (or *SystemInformationBlockType2-NB* in NB-IoT);
1> else:
  2> reconfigure the value of timers and constants in accordance with received *rlf-TimersAndConstants*;
1> if the received *rlf-TimersAndConsontsSCG* is set to release:
  2> stop timer T313, if running, and
  2> release the value of timer *t313* as well as constants *n313* and *n314*;
1> else:
  2> reconfigure the value of timers and constants in accordance with received *rlf-TimersAndConstantsSCG*;
. . .

5.3.10.11 SCG dedicated resource configuration
The UE shall:
. . .
 1> if the received radioResourceConfigDecliagedSCG includes the rlf-TimersAndConstantsSCG:
  2> reconfigure the values of timers and constants as specified in 5.3.10.7;
. . .

5.3.11 Radio link failure related actions
5.3.11.1 Detection of physical layer problems in RRC_CONNECTED
The UE shall:
 1> upon receiving N310 consecutive "out-of-sync" indications for the PCell from lower layers while neither T300, T301, T304 nor T311 is running:
  2> start timer T310;
 1> upon receiving N313 consecutive "out-of-sync" indications for the PSCell from lower layers while T307 is not running:
  2> start T313;
NOTE: Physical layer monitoring and related autonomous actions do not apply to SCells except for the PSCell.
5.3.11.2 Recovery of physical layer problems
Upon receiving N311 consecutive "in-sync" indications for the PCell from lower layers while T310 is running, the UE shall:
 1> stop timer T310;
 1> stop timer T312, if running;
NOTE 1: In this case, the UE maintains the RRC connection without explicit signalling, i.e. the UE maintains the entire radio resource configuration.
NOTE 2: Periods in time where neither "in-sync" nor "out-of-sync" is reported by layer 1 do not affect the evaluation of the number of consecutive "in-sync" or "out-of-sync" indications.
Upon receiving N314 consecutive "in-sync" indications for the PSCell from lower layers while T313 is running, the UE shall:
 1> stop timer T313;
5.3.11.3 Detection of radio link failure
The UE shall:
 1> upon T310 expiry; or
 1> upon T312 expiry; or
 1> upon random access problem indication from MCG MAC while neither T300, T301, T304 nor T311 is running; or
 1> upon indication from MCG RLC that the maxim-um number of retransmissions has been reached for an SRB or for an MCG or split DRB:
  2 > consider radio link failure to be detected for the MCG i.e. RLF;
  2> except for NB-IoT, store the following radio link failure information in the VarRIF-Report by setting its fields as follows:
   3 >clear the information included in *VarRLF-*
  Report, if any;
. . .
   3> set the *connectionFailureType* to *rlf*;
   3> set the *c-RNTI* to the C-RNTI used in the PCell;
   3> set the *rlf-Cause* to the trigger for detecting radio link failure;
  2> if AS security has not been activated:
   3> if the UE is a NB-IoT UE:
    4> perform the actions upon leaving RRC_CONNECTED as specified in 5.3.12, with release cause 'RRC connection failure';

```
   3> else:
      4> perform the actions upon leaving
   RRC_CONNECTED as specified in 5.3.12, with release
   cause 'other';
   2> else:
      3> initiate the connection re-establishment
   procedure as specified in 5.3.7;
The UE shall:
   1> upon T313 expiry; or
   1> upon random access problem indication from SCG MAC; or
   1> upon indication from SCG RlX that the maximum number of
retransmissions has been reached for an SCG or split DRB:
      2> consider radio link failure to be detected for the SCG i.e.
   SCG-RLF;
      2> initiate the SCG failure information procedure as
   specified in 5.6.13 to report SCG radio link failure;
The UE may discard the radio link failure information, i.e. release the UE
variable VarRLF-Report, 48 hours after the radio link failure is detected, upon
power off or upon detach.
5.3.12 UE actions upon leaving RRC_CONNECTED
Upon leaving RRC_CONNECTED, the UE shall:
   1> reset MAC;
   1> stop all timers that are running except T320, T322, T325, T330;
   1> if leaving RRC_CONNECTED was triggered by suspension of
the RRC:
 . . .
   1> else:
      2> release all radio resources, including release of the RLC
   entity, the MAC configuration and the associated PDCP entity for all
   established RBs;
      2> indicate the release of the RRC connection to upper
   layers together with the release cause;
 . . .
```

The information element (IE) RLF-TimersAndCOnstants contains UE specific timers and constants applicable for UEs in RRC_CONNECTED. The abstract syntax notation one (ASN.1) for the RLF-TimersAndConstants IE is shown below.

```
-- ASN1START
RLF-TitnersAndConstants-r9 ::=   CHOICE {
   release                       NULL,
   setup                         SEQUENCE {
      t301-r9                    ENUMERATED {
   ms100, ms200, ms300,
ms400, ms600, ms1000, ms1500, ms2000},
      t310-r9                    ENUMERATED {
   ms0, ms50, ms100 ms200,
ms500, ms1000, ms2000},
      n310-r9                    ENUMERATED {
   n1, n2, n3, n4, n6, n8, n10,
n20},
      t311-r9                    ENUMERATED {
   ms1000, ms3000, ms5000,
ms10000, ms15000, ms2000, ms30000},
      n311-r9                    ENUMERATED {
   n1, n2, n3, n4, n5, n6, n8,
n10},
      ...
   }
}
RLF-TimersAndConstants-r13 ::=  CHOICE {
   release                       NULL,
   setup                         SEQUENCE {
      t301-v1310                 ENUMERATED {
   ms2500, ms3000,
ms3500, ms4000, ms5000, ms6000, ms8000, ms10000},
      [[ t310-v1330              ENUMERATED {ms400,
ms6000} OPTIONAL --Need ON
      ]]
   }
}
RLF-TimersAndConstantsSCG-r12 ::= CHOICE {
   release                       NULL,
   setup                         SEQUENCE {
      t313-r12                   ENUMERATED {
   ms0, ms50, ms100, ms200,
ms500, ms1000, ms2000},
      n313-r12                   ENUMERATED {
   n1, n2, n3, n4, n6, n8, n10,
n20},
      n314-r12                   ENUMERATED {
   n1, n2, n3, n4, n5, n6, n8, n10},
      ...
   }
}
-- ASN1STOP
```

Table 1 below provides field descriptions for the RLF-TimersAndConstants

TABLE 1

RLF-TimersAndConstants field descriptions n3xy
Constants are described in section 7.4. n1 corresponds with 1, n2 corresponds with 2 and so on.

t3xy
Timers are described in section 7.3. Value ms0 corresponds with 0 ms, ms50 corresponds with 50 ms and so on.
E-UTRAN configures RLF-TimersAndConstants-r13 only if UE supports ce-ModeB. UE shall use the extended values t3xy-v1310 and t3xy-v1330, if present, and ignore the values signaled by t3xy-r9.

Additional information about the timers and constants are provided in Tables 2 and 3 below, respectively.

TABLE 2

Timers

| Timer | Start | Stop | At expiry |
|---|---|---|---|
| T301 NOTE1 | Transmission of RRCConnection Reestablishment Request | Reception of RRCConnectionReestablishment or RRCConnectionReestablishmentReject message as well as when the selected cell becomes unsuitable | Go to RRC_IDLE |
| T310 NOTE1 NOTE2 | Upon detecting physical layer problems for the PCell i.e. upon receiving N310 consecutive out-of-sync indications from lower layers | Upon receiving N311 consecutive in-sync indications from lower layers for the PCell, upon triggering the handover procedure and upon initiating the connection re-establishment procedure | If security is not activated: go to RRC_IDLE else: initiate the connection re-establishment procedure |
| T311 NOTE1 | Upon initiating the RRC connection re-establishment procedure | Selection of a suitable E-UTRA cell or a cell using another RAT. | Enter RRC_IDLE |
| T313 NOTE2 | Upon detecting physical layer problems for the PSCell i.e. upon receiving N313 consecutive out-of-sync indications from lower layers | Upon receiving N314 consecutive in-sync indications from lower layers for the PSCell, upon initiating the connection re-establishment procedure, upon SCG release and upon receiving RRCConnection Reconfiguration including MobilityControlInfoSCG | Inform E-TRAN about the SCG radio link failure by initiating the SCG failure information procedure as specified in 5.6.13. |

NOTE1:
Only the timers marked with "NOTE1" are applicable to NB-IoT.
NOTE2:
The behaviour as specified in 7.3.2 applies.

TABLE 3

Constants

| Constant | Usage |
|---|---|
| N310 | Maximum number of consecutive "out-of-sync" indications for the PCell received from lower layers |
| N311 | Maximum number of consecutive "in-sync" indications for the PCell received from lower layers |
| N313 | Maximum number of consecutive "out-of-sync" indications for the PSCell received from lower layers |
| N314 | Maximum number of consecutive "in-sync" indications for the PSCell received from lower layers |

When DRX is in use, the OOS and IS evaluation periods are extended in order to enable sufficient UE power saving. In such a scenario, the length of the OOS and IS evaluation periods depend upon the configured DRX cycle length. The UE starts IS evaluation whenever OOS occurs. Therefore, the same period (TEvaluate_Qout_DRX) is used for the evaluation of OOS and IS. However, upon starting the RLF timer (T310) until its expiry, the IS evaluation period is shortened to 100 ms, which is the same as without DRX. If the timer T310 is stopped due to N311 consecutive IS indications, the UE performs IS evaluation according to the DRX-based period (TEvaluate_Qout_DRX).

The whole methodology used for RLM in LTE (i.e., measuring the CRS to "estimate" the PDCCH quality) relies on the fact that the UE is connected to an LTE cell, which is the single connectivity entity transmitting PDCCH and CRSs.

In summary, RLM in LTE has been specified so that the network does not need to configure any parameter (i.e., the UE generates IS/OOS events internally from lower to higher layers to control the detection of radio link problems). On the other hand, RLF/Secondary Cell Group (SCG) Failure procedures are controlled by RRC and configured by the network via counters (e.g., N310, N311, N313, N314 (which work as filters to avoid triggering RLF too early) and timers (e.g., T310, T311, T313 and T314).

The RLF parameters are configured in the IEs rlf-TimersAndConstants or radioResourceConfigDedicated IE. The rlf-TimersAndConstants IE can be transmitted in SystemInformationBlockType2 (or SystemInformationBlockType2-NB in Narrowband Internet-of-Things (NB-IoT)). The radioResourceConfigDedicated IE can be within RRC messages such as RRCConnectionReconfiguration. RRCConnectionReestablishment or RRCConnectionResume, and RRCConnectionSetup.

The SCG Failure parameters are configured in the IEs rlf-TimersAndConstantsSCG, which can be transmitted in the RadioResourceConfigDedicatedSCG-r12 IE. The RadioResourceConfigDedicatedSCG-r12 can be transmitted within RRCConnectionReconfiguration.

In New Radio (NR), RLM is also defined for a similar purpose as in LTE (i.e., to monitor the DL radio link quality of the serving cell in RRC_CONNECTED state). Unlike LTE, however, some level of configurability has been introduced for RLM in NR in terms of reference signal (RS) type/beam/RLM resource configuration and BLER thresholds for IS/OOS generation.

With respect to RS type/beam/RLM resource configuration, in NR two RS types are defined for L3 mobility: Physical Broadcast Channel (PBCH)/Synchronization Signal (SS) Block (SSB or SS Block); and Channel State Information Reference Signal (CSI-RS). The SSB basically comprises synchronization signals equivalent to the Primary Synchronization Signal (PSS) and Secondary Synchronization Signal (SSS) in LTE and PBCH/Demodulation Reference Signals (DMRS). The CSI-RS for L3 mobility are more configurable and configured via dedicated signalling. There are different reasons to define the two RS types, one of them being the possibility to transmit SSBs in wide beams and transmit CSI-RSs in narrow beams.

In RAN1 #NR AdHoc #2, it was agreed that in NR the RS type used for RLM is also configurable (both CSI-RS-based RLM and SSB-based RLM are supported). It seems natural that the RS type for RLM should be configured via RRC signalling. In RAN1 #90, it was agreed to support single RLM-RS type only to different RLM-RS resources for a UE at a time.

As NR can operate in quite high frequencies (above 6 GHz, but up to 100 GHz), these RS types used for RLM can be beamformed. In other words, depending on deployment or operating frequency, the UE can be configured to monitor beamformed reference signals regardless of which RS type is selected for RLM. Hence, unlike LTE, RS for RLM can be transmitted in multiple beams.

In the case of CSI-RS, the time/frequency resource and sequence can be used. As there can be multiple beams, the UE needs to know which ones to monitor for RLM and how to generate IS/OOS events. In the case of SSB, each beam can be identified by an SSB index (derived from a time index in PBCH and/or a PBCH/DMRS scrambling). In RAN1 #90, it was agreed that this is configurable and, in NR the network can configure by RRC signalling, X RLM resources, either related to SS blocks or CSI-RS. One RLM-RS resource can be either one PBCHSS block or one CSI-RS resource/port. The RLM-RS resources are UE-specifically configured at least in case of CSI-RS based RLM. When the UE is configured to perform RLM on one or multiple RLM-RS resource(s): periodic IS is indicated if the estimated link quality corresponding to hypothetical PDCCH BLER based on at least Y RLM-RS resource(s) among all configured X RLM-RS resource(s) is above Q_in threshold; and periodic OOS is indicated if the estimated link quality corresponding to hypothetical PDCCH BLER based on all configured X RLM-RS resource(s) is below Q_out threshold. There may also be a change in the number of RLM resources.

With respect to IS/OOS and BLER threshold configuration, the UE needs to know which resources to monitor, as well as how to generate IS/OOS events to be reported internally to higher layers. With respect to the generation of IS/OOS indication(s), in RAN1 #89 and RAN1 #90 it was agreed that RAN1 plans to provide at least periodic IS/OOS indications and hypothetical PDCCH BLER is used as the metric for determining IS/OOS conditions for both PBCH/SS block-based and CSI-RS-based RLM.

Unlike LTE, in which the signal-to-interference-plus-noise ratio (SINR) maps to a 10% BLER for the generation of OOS events and the SINR maps to a BLER of 2% for the generation of IS events, configurable values can be defined in NR. In RAN1 #90 it was agreed that NR supports more than one in-sync BLER value(s) and out-of-sync BLER value(s) for a hypothetical PDCCH, although in RAN1 #AdHoc it was agreed that a single IS BLER and OOS BLER pair can be configured at a time for a UE, from two possible pairs of values (to be decided by RAN4). Hence, unlike LTE, the BLER thresholds for IS/OOS generation will be configurable in NR.

While the RLM functionality had significant changes in NR (i.e., a more configurable procedure has been defined in which the network can define the RS type, exact resources to be monitored, and even the BLER for IS and OOS indications), RLF did not have major changes in NR compared to LTE. In RAN2 #99-bis in Prague, it was agreed that (1) RLF detection will be specified for NR in the RRC specification (as in LTE) and (2) for December 17, RLF will be based on the periodic IS/OOS indications from L1 (i.e., this is the same frame work as LTE). Moreover, it was agreed that for connected mode, the UE declares RLF upon timer expiry due to DL OOS detection, random access procedure failure detection, and RLC failure detection. It is for further study (FFS) whether maximum Automatic Repeat Request (ARQ) retransmission is the only criteria for radio link control (RLC) failure. It was also agreed that in the NR RLM procedure, the physical layer performs OOS/IS indication and RRC declares RLF. It was also agreed that for RLF purposes, the RAN 2 preference is that the IS/OOS indication should be a per-cell indication, with an aim for a single procedure for both multi-beam and single-beam operation.

At RAN2 #99 in Berlin, it was further agreed that the RAN2 understanding of RAN 1 agreements that at least physical layer informs RRC of periodic OOS/IS indications, and that the baseline behavior when there are no indications from the lower layers related to beam failure/recovery is that (1) RRC detects a DL radio link problem if consecutive N1 number of periodic OOS indications are received and (2) RRC stops the timer if consecutive N2 number of periodic IS indications are received while the timer runs. In other words, as in LTE, one can assume that RLF in NR will also be governed by the following parameter or equivalent ones: counters N310, N311, N313, N314: and timers 310, T311, T301, T313, T314.

How the RLF variables could be configured in NR and UE behavior as recently agreed for NR is reproduced below.

---

5.3.11 Radio link failure related actions
5.3.11.1 Detection of physical layer problems in RRC_CONNECTED
The UE shall:
  1> upon receiving N310 consecutive "out-of-sync" indications for
the PCell from lower layers while T311 is not running:
    2> start timer T310;
  1> upon receiving N313 consecutive "out-of-sync" indications for
the PSCell from lower layers while T307 is not running:
    2> start T313;
*FFS: Under which condition physical layer problems detection is performed,
e.g. neither T300, T301, T304 nor T311 is running. It's subject to the
harmonization of the RRC procedures for RRC Connection
establishment/resume/ re-establishment and RRC connection reconfiguration.
FFS: The naming of the timers.*
5.3.11.2 Recovery of physical layer problems
Upon receiving N311 consecutive "in-sync" indications for the PCell from
lower layers while 1310 is running, the UE shall:
  1> stop timer T310;
*FFS: whether to support T312 for early RLF declaration in NR.*
  NOTE 1: In this case, the UE maintains the RRC
connection without explicit signalling, i.e. the UE maintains the entire radio
resource configuration.
  NOTE 2: Periods in time where neither "out-of-sync" nor "out-
  of-sync" is reported by layer 1 do not affect the evaluation of the number
  of consecutive "in-of-sync" or "out-of-sync" indications.
Upon receiving N314 consecutive "in-of-sync" indications for the PSCell from
lower layers while T313 is running, the UE shall:
  1> stop timer T313;
5.3.11.3 Detection of radio link failure
The UE shall:
  1> upon T310 expiry; or
  1> upon random access problem indication from MCG MAC while
  T311 is not running; or
*FFS: Under which condition physical layer problems detection is performed,
e.g. neither T300, T301, T304 nor T311 is running. its subject to the*

-continued

*harmonization of the RRC procedures for RRC Connection establishment/resume/ re-establishment and RRC connection reconfiguration.*
1> upon indication from MCG RLC that the maximum number of retransmissions has been reached for an SRB or for an MCG or split DRB:
*FFS whether maximum ARQ retransmission is only criteria for RTC failure.*
  2> consider radio link failure to be detected for the MCG i.e. RLF;
*FFS Whether indications related to beam ,ktilure recovery may affect the declaration of RLF*
*FFS: How to handle RLC failure in CA duplication for MCG DRB and SRB.*
*FFS: RLE related measurement reports e.g VarRLF-Report is supported in NR.*
  2> if AS security has not been activated;
    3> perform the actions upon leaving RRC_CONNECTED as specified in x.x.x, with release cause 'other';
  2> else:
    3> initiate the connection re-establishment procedure as specified in x.x:x;
The UE shall:
1> upon T313 expiry; or
1> upon random access problem indication from SCG MAC; or
1> upon indication from SCG RLC that the maximum number of retransmissions has been reached for an SCG SRB, SCG or split DRB:
  2> consider radio link failure to be detected for the SCG i.e. SCG-RLF;
*FFS: How to handle RLC failure in CA duplication for SCG DRB and SRB.*
  2> initiate the SCG failure information procedure as specified in 5.6.4 to report SCG radio link failure;

Additional information about the timers and constants could be configured in NR are provided in Tables 4 and 5 below, respectively.

TABLE 4

Timers

| Timer | Start | Stop | At expiry |
|---|---|---|---|
| T307 | Reception of RRCConnection Reconfiguration message including MobilityControl InfoSCG | Successful completion of random access on the PSCell, upon initiating re-establishment and upon SCG release | Inform E-UTRAN/NR about the SCG change failure by initiating the SCG failure information procedure as specified in 5.6.4. |
| T310 | Upon detecting physical layer problems for the PCell i.e. upon receiving N310 consecutive out-of-sync indications from lower layers | Upon receiving N311 consecutive in-sync indications from lower layers for the PCell, upon triggering the handover procedure and upon initiating the connection re-establishment procedure | If security is not activated: go to RRC_IDLE else: initiate the connection re-establishment procedure |
| T311 | Upon initiating the RRC connection re-establishment procedure | Selection of a suitable NR cell or a cell using another RAT. | Enter RRC_IDLE |
| T313 | Upon detecting physical layer problems for the PSCell i.e. upon receiving N313 consecutive out-of-sync indications from lower layers | Upon receiving N314 consecutive in-sync indications from lower layers for the PSCell, upon initiating the connection re-establishment procedure, upon SCG release and upon receiving RRCConnection Reconfiguration including MobilityControlInfoSCG | Inform E-UTRAN/NR about the SCG radio link failure by initiating the SCG failure information procedure as specified in 5.6.4. |

TABLE 5

Constants

| Constant | Usage |
|---|---|
| N310 | Maximum number of consecutive "out-of-sync" indications for the PCell received from lower layers |
| N311 | Maximum number of consecutive "in-sync" indications for the PCell received from lower layers |
| N313 | Maximum number of consecutive "out-of-sync" indications for the PSCell received from lower layers |
| N314 | Maximum number consecutive "in-sync" indications for the PSCell received from lower layers |

As noted above, the IE RLF-TimersAndConstants contains UE specific timers and constants applicable for UEs in RRC_CONNECTED. An example of how the ASN.1 for the RLF-TimersAndConstants IE could appear in NR is shown below.

```
-- ASN1START
RLF-TimersAndConstants::= CHOICE {
    release                         NULL,
    setup                           SEQUENCE {
        t301                        EENUMERATED {
    ms100, ms200, ms300,
ms400, ms600, ms1000, ms1500,
    ms2000, ms2500,
ms3000, ms3500, ms4000, ms5000,
    ms6000, ms8000,
ms10000},
        t310                        ENUMERATED {
    ms0, ms50, ms100,
ms200 ms500, ms1000, rns2000, ms4000, ms6000},
        n310                        ENUMERATED {
    n1, n2, n3, n4, n6, n8, n10,
n20},
        t311                        ENUMERATED {
    ms1000, ms3000,
ms5000, ms10000, ms15000,
    ms20000, tns30000 },
        n311                        ENUMERATED {
    n1, n2, n3, n4, n5, n6, n8,
n10},
```

```
        ...
    }
}
    t313                    ENUMERATED {
        ms0, ms50, ms100, ms200,
    ms500, ms1000, ms2000},
    n313                    ENUMERATED {
        n1, n2, n3, n4, n6, n8, n10,
    n20},
    n314                    ENUMERATED {
        n1, n2, n3, n4, n5, n6, n8,
    n10},
    ...
    }
}
-- ASN1STOP
```

RAN1 introduced the concept of bandwidth parts (BWPs), which intends to configure the UE with an operation bandwidth that can be less than the actual carrier bandwidth. This has similarities to the handling of "bandwidth reduced" UEs in LTE (Cat-M1), which are not able to operate on the entire carrier bandwidth. Note that this description is primarily about carriers spanning several 100 MHz and UEs supporting, for example, "only" carriers of 100 MHz. In other words, this concept addresses UEs supporting an operating bandwidth that is 100 times wider than for Cat-M1. Like in LTE Cat-M1, the configured BWP may not coincide with the carrier's SSB (PSS/SSS/PBCH/Master Information Block (MIB)) and it must be determined how the UE acquires cell synchronization, performs measurements, and acquires system information block (SIB) in such cases. Besides this core part of the BWP functionality, RAN1 also discussed other variations (e.g., with additional SSBs in the same carrier or in the same BWP as well as the possibility to configure a UE with several possibly overlapping BWPs among which the network can switch by means of L control signals (e.g., downlink control information (DCI)).

FIG. 3 illustrates an example of bandwidth parts. More particularly, FIG. 3 illustrates the bandwidth of a single wide component carrier 300 made up of a number of physical resource blocks (PRBs) 1 through N. In the example of FIG. 3, three BWPs are shown, BWPs 305A, 305B, and 305C. BWP 305A is a first bandwidth part for a first UE, UE 1. BWP 305B is a first bandwidth part for a second UE, UE2. BWP 305C is a second bandwidth part for the second UE, UE2. BWP 305A for UE1 corresponds to the max bandwidth of UE1, while BWP 305C corresponds to the max bandwidth of UE2.

The DL and UL BWPs determine the frequency range in which the UE is required to receive and transmit data channels (e.g., Physical DL Shared Channel (PDSCH) and Physical UL Shared Channel (PUSCH)) and corresponding control channels (PDCCH and Physical UL Control Channel (PUCCH)). As a starting point, a BWP cannot span more than the configured carrier bandwidth. Thus, a BWP is smaller or equal to (but not larger than) than the carrier bandwidth.

A key aspect of the BWP concept (as opposed to using only the carrier bandwidth) is to support UEs that cannot handle the entire carrier bandwidth. UEs supporting the full carrier bandwidth can also utilize the entire carrier. Hence, it is envisioned that the network configures the DL BWP and the UL BWP in dedicated signaling in accordance with the UE capabilities.

For example, BWPs can be configured by dedicated signaling in the first RRCConnectionReconfguration after connection establishment (i.e., when the network knows the UE capabilities). Before that point in time, however, the UE must read the PDCCH and PDSCH to acquire SIB1 to receive paging messages and to receive Msg2, Msg4 (of the random access procedure) and the above-described RRC-ConnectionReconfiguration. Hence, the UE must be configured with an "initial BWP." In RAN1, it was agreed that there is an initial active DL/UL BWP pair that is valid for a UE until the UE is explicitly configured (or reconfigured) with BWP(s) during or after RRC connection is established. It was further agreed that the initial active DL/UL bandwidth part is confined within the UE minimum bandwidth for the given frequency band. The details of initial active DL/UL BWP are for further study.

In some cases, a network may decide to configure a wider initial BWP than some UEs support. This may be the case, for example, if the network wants to optimize the SIB acquisition time or connection establishment time by using a wider bandwidth. But this situation may also occur if a legacy network does not yet support UEs with lower complexity. The UE discovers this based on the initial BWP configured in MIB and, since it cannot acquire SIB1, it should consider the cell as barred.

Upon successful connection establishment, the network should configure a BWP in accordance with the UE capabilities. The BWP configuration is specific for a serving cell (i.e., the network must configure at least a DL BWP for each serving cell). The UL BWP is configured for Primary Cells (PCells) and for Secondary Cells (SCells) with configured UL.

FIG. 4 illustrates an example of default bandwidth parts. More particularly, FIG. 4 illustrates the bandwidth of a single wide component carrier 400 made up of a number of PRBs 1 through N. In addition, component carrier 400 also includes an SSB. In the example of FIG. 4, four BWPs are shown, BWPs 405A, 405B, 405C, and 405D. BWP 405A is a first bandwidth part, while BWP 405B is the default bandwidth part for BWP 405A. Similarly, BWP 405C is a second bandwidth part, while BWP 405D is the default BWP for BWP 405C.

In LTE, each cell was characterized by its center frequency (UL+DL for Frequency Division Duplex (FDD)), by the carrier bandwidth, and by the PCI conveyed in PSS/SSS. The PSS/SSS used to be at the carrier's center frequency. In NR however, the SSB-frequency is not necessarily the center frequency, which will require signaling both values or one value and an offset (as already discussed in the context of Radio Resource Management (RRM) measurements). Upon initial access, the UE must discover the (one) SSB, acquire synchronization, acquire MIB, and then attempt to read SIB. At this point the UE has selected the cell (i.e., an SSB on a certain frequency).

When the UE establishes an RRC connection, the network may configure a dedicated BWP. That BWP may overlap with the SSB's frequency. If so, the UE is able to acquire (or re-acquire) the SSB at any time in order to re-gain sync and to perform SS-based measurements. If the UE's DL BWP coincides with the SSB-frequency of the UE's serving cell, the UE does not require inter-frequency measurement gaps to acquire (or re-acquire) the SSB and to perform SS-based measurements.

If the operating bandwidth of a cell (carrier) is wide and if many UEs have an operation bandwidth that is significantly narrower than the carrier bandwidth, however, the network will allocate UEs to BWPs that do not coincide with the SSB frequency in order to balance the load and to maximize the system capacity. Such a scenario is illustrated in FIG. 4, where BWP 405A and 405C do not coincide with the SSB on component carrier 400. As in LTE Cat-M1, this implies that these UEs need (inter-frequency, intra-carrier) measurement gaps to re-sync with their serving cell's SSB and to detect and measure neighbor cells. In other words, if the UE's DL BWP does not coincide with the SSB-frequency of the UE's serving cell, the UE requires inter-frequency (intra-carrier) measurement gaps to acquire (or re-acquire) the SSB and to perform SS-based measurements.

This is a natural consequence of the decision to deploy a cell with a wide operating bandwidth with just a single SSB and a single occurrence of System Information. Nevertheless, RAN1 suggests introducing the possibility to inform a UE about additional SSB frequencies within a carrier and thereby ensure that each/more UE find an SSB in their configured BWP. At first glance this would remove the need for measurement gaps. It does not, however, fit with how RAN2 defined RRM measurements. In most RRM measurement events, the UE compares a neighbor cell to the serving cell. As explained above, a cell is characterized by an SSB on a certain frequency and by the associated SIB1. The UE selects such cell (initial access) or is configured with that serving cell (e.g., during handover (HO) SCell addition). This seems to suggest that a UE being configured with a BWP containing its own SSB should be moved to that cell (i.e., the UE must do an inter-frequency HO from its original serving cell's SSB to the BWP's SSB). If that SSB is also associated with system information (at least SIB1), the UE can camp on that SSB, which is actually just another cell. Thus, configuring a UE with a BWP and an SSB inside that BWP is equivalent to an inter-frequency HO if that SSB is associated with at least SIB1.

This ensures that all RRM measurement definitions remain unchanged (i.e., the UE considers simply that new SSB as its serving cell and searches (typically) for neighbor cells' SSBs on the same frequency).

A change of the BWP will typically require re-tuning the UE's radio frequency (RF). Such RF re-tuning occurs, for example, upon SCell Activation/Deactivation in LTE. Based on the RAN4 assessment, it caused at least interruptions (e.g., glitches) in the order of a subframe. Activating a new carrier was found to take up to ~30 ms. RAN4 has not investigated how long it may take to switch among BWPs. It may depend on whether the BWPs use the same SSB as synchronization reference and on whether one BWP is just a subset of the other BWP or not. RAN1 discussed the possibility to configure several possibly overlapping BWPs via RRC and to toggle then more dynamically by L1 control signaling.

The topic of BWP and multi-SSB per carrier was discussed in RAN2 #99-bis and the following agreements were made for BWP operation in CONNECTED mode. RRC signaling supports to configure one or more BWPs (both for DL BWP and UL BWP) for a serving cell (PCell, PSCell). RRC signaling supports to configure 0, 1 or more BWPs (both for DL BWP and UL BWP) for a serving cell SCell (at least 1 DL BWP). For a UE, the PCell, PSCell and each SCell has a single associated SSB in frequency (the RAN1 terminology is the "cell defining SSB"). Cell defining SS block can be changed by synchronous reconfiguration for PCell/PSCell and SCell release/add for the SCell. Each SS block frequency which needs to be measured by the UE should be configured as an individual measurement object (i.e., one measurement object corresponds to a single SS block frequency). The cell defining SS block is considered as the time reference of the serving cell, and for RRM serving cell measurements based on SSB (irrespective of which BWP is activated). Whether further optimisation is needed for change of SS block location in frequency (but with no change to PCI and no change in system frame number (SFN)) to be changed by RRC reconfiguration of physical layer parameters with no L2 involvement is for further study.

Considering that RLM can be performed by configuring PBCH/SS blocks or CSI-RS resources, and that for a given cell there will be only one PBCH/SS Block and that might not fall within the active BWP, there are some problems for RLM configuration in the context of BWPs. The main problem is that when changing BWP (e.g., using L1 signaling or relying on a timer-based solution where the UE should switch from one BWP to another BWP when the timer expires), the UE may require using measurement gaps to perform RRM measurements even for the serving cell in the case these are configured to be based on PBCH/SS blocks and the PBCH/SS block for the serving cell is not within the active BWP the UE is being switched to. In addition, changing BWP may lead to changes in the RLM resources the UE monitors, especially if the PDCCH configuration also changes. Furthermore, there could be a need to change the RS type the UE monitors as the target active BWP may not include the RS type/resources the UE was monitoring in the previous active BWP. There may also be a change in the number of RLM resources.

SUMMARY

To address the foregoing problems with existing solutions, disclosed is a method in a UE. The method comprises obtaining one or more radio link monitoring configurations, each radio link monitoring configuration associated with at least one bandwidth part. The method comprises determining that the UE is to switch from a source bandwidth part to a target bandwidth part. The method comprises performing radio link monitoring on the target bandwidth part according to an obtained radio link monitoring configuration associated with the target bandwidth part.

In certain embodiments, obtaining the one or more radio link monitoring configurations may comprise receiving the one or more radio link monitoring configurations in a message from a network node. In certain embodiments, obtaining the one or more radio link monitoring configurations may comprise determining the one or more radio link monitoring configurations according to one or more pre-defined rules.

In certain embodiments, each radio link monitoring configuration may comprise: a set of radio resources for performing radio link monitoring within its associated bandwidth part; and one or more configuration parameters for performing radio link monitoring within its associated bandwidth part.

In certain embodiments, the set of radio resources may comprise a CSI-RS resource. In certain embodiments, the set of radio resources may comprise a SSB.

In certain embodiments, the one or more configuration parameters for performing radio link monitoring within its associated bandwidth part may comprise one or more of; one or more filtering parameters; one or more radio link failure timers: an evaluation period: a number of retransmissions before radio link failure is declared; a hypothetical channel configuration: a hypothetical signal configuration, and a mapping function for a measured link quality and a hypothetical channel block error rate. In certain embodiments, the one or more configuration parameters for performing radio link monitoring within its associated bandwidth part may comprise one or more filtering parameters and the one or more filtering parameters may comprise one or more of N310. N311, and N313. N314 counters. In certain embodiments, the one or more configuration parameters for performing radio link monitoring within its associated bandwidth part may comprise one or more radio link failure timers and the one or more radio link failure timers may comprise one or more of T310, T311, T313, and T314 timers.

In certain embodiments, at least one of the obtained one or more radio link monitoring configurations may comprise a default radio link monitoring configuration. In certain embodiments, the default radio link monitoring configuration may be associated with a default bandwidth part.

In certain embodiments, the method may comprise performing monitoring of a downlink channel quality of a first bandwidth part and a second bandwidth part. In certain embodiments, the performing monitoring may comprise: estimating, during a first period of time, a radio link quality of the first bandwidth part according to a radio link monitoring configuration associated with the first bandwidth part; and estimating, during a second period of time, a radio link quality of the second bandwidth part according to a radio link monitoring configuration associated with the second bandwidth part, wherein the second period of time at least partially overlaps with the first period of time. In certain embodiments, the first bandwidth part may comprise the source bandwidth part and the second bandwidth part may comprise the target bandwidth part. In certain embodiments, the monitoring may be triggered based on an activation rate of one or more of the first bandwidth part and the second bandwidth part.

In certain embodiments, the radio link monitoring configuration associated with the target bandwidth part may comprise a plurality of sets of radio resources, and the method may further comprise selecting one or more of the plurality of sets of radio resources to use to perform radio link monitoring on the target bandwidth part based on a pre-defined rule.

In certain embodiments, a plurality of radio link monitoring configurations may be associated with the target bandwidth part, and the method may further comprise receiving an instruction via downlink control information to use one of the plurality of radio link monitoring configurations to perform radio link monitoring on the target bandwidth part.

In certain embodiments, a radio link monitoring configuration associated with the source bandwidth part and the radio link monitoring configuration associated with the target bandwidth part may use the same radio resources, and performing radio link monitoring on the target bandwidth part according to the obtained radio link monitoring configuration associated with the target bandwidth part may comprise using one or more of previously-performed measurements and previously-performed measurement samples to generate out-of-sync and in-sync events.

In certain embodiments, a radio link monitoring configuration associated with the source bandwidth part and the radio link monitoring configuration associated with the target bandwidth part may use different radio resources. In certain embodiments, performing radio link monitoring on the target bandwidth part according to the obtained radio link monitoring configuration associated with the target bandwidth part may comprise applying a relation function to one or more of previously-performed measurements and previously-performed measurement samples to generate out-of-sync and in-sync events without resetting a radio link failure timer or a radio link failure counter. In certain embodiments, performing radio link monitoring on the target bandwidth part according to the obtained radio link monitoring configuration associated with the target bandwidth part may comprise resetting at least one of a radio link failure timer and a radio link failure counter. In certain embodiments, resetting at least one of a radio link failure timer and a radio link failure counter may comprise resetting a set of radio link failure timers and radio link failure counters associated with radio link monitoring for out-of-synch events and allowing a set of radio link failure timers and radio link failure counters associated with radio link monitoring for in-synch events to continue. In certain embodiments, resetting at least one of a radio link failure timer and a radio link failure counter may comprise resetting one or more radio link failure timers without resetting any radio link failure counters.

Also disclosed is a UE. The UE comprises a receiver, a transmitter, and processing circuitry coupled to the receiver and the transmitter. The processing circuitry is configured to obtain one or more radio link monitoring configurations, each radio link monitoring configuration associated with at least one bandwidth part. The processing circuitry is configured determine that the UE is to switch from a source bandwidth part to a target bandwidth part. The processing circuitry is configured to perform radio link monitoring on the target bandwidth part according to an obtained radio link monitoring configuration associated with the target bandwidth part.

Also disclosed is a computer program, the computer program comprising instructions configured to perform the above-described method in a UE.

Also disclosed is a computer program product, the computer program product comprising a non-transitory computer-readable storage medium, the non-transitory computer-readable storage medium comprising a computer program comprising computer-executable instructions which, when executed on a processor, are configured to perform the above-described method in a UE.

Also disclosed is a method in a network node. The method comprises determining one or more radio link monitoring configurations, each radio link monitoring configuration associated with at least one bandwidth part. The method comprises configuring a UE to perform radio link monitoring on a target bandwidth part according to a radio link monitoring configuration associated with the target bandwidth part.

In certain embodiments, configuring the UE to perform radio link monitoring on the target bandwidth part according to the radio link monitoring configuration associated with the target bandwidth part may comprise sending an indication of the radio link monitoring configuration associated with the target bandwidth part to the UE. In certain embodiments, sending the indication of the radio link monitoring configuration associated with the target bandwidth part to the UE may comprise sending an indication of the radio link monitoring configuration associated with the target bandwidth part in an information element within a bandwidth part configuration for the target bandwidth part. In certain embodiments, sending the indication of the radio link monitoring configuration associated with the target bandwidth part to the UE may comprise sending an indication of the radio link monitoring configuration associated with the target bandwidth part in an information element within a serving cell configuration. In certain embodiments, the indication may comprise a radio link monitoring configuration identifier.

In certain embodiments, configuring the UE to perform radio link monitoring on the target bandwidth part according to the radio link monitoring configuration associated with the target bandwidth part may comprise configuring the UE to determine the radio link monitoring configuration associated with the target bandwidth part according to one or more predefined rules.

In certain embodiments, each radio link monitoring configuration may comprise a set of radio resources for performing radio link monitoring within its associated bandwidth part and one or more configuration parameters for performing radio link monitoring within its associated bandwidth part. In certain embodiments, the set of radio resources may comprise a CSI-RS resource. In certain embodiments, the set of radio resources may comprise a SSB.

In certain embodiments, the one or more configuration parameters for performing radio link monitoring within its associated bandwidth part comprise one or more of: one or more filtering parameters; one or more radio link failure timers; an evaluation period; a number of retransmissions before radio link failure is declared; a hypothetical channel configuration; a hypothetical signal configuration; and a mapping function for a measured link quality and a hypothetical channel block error rate. In certain embodiments, the one or more configuration parameters for performing radio link monitoring within its associated bandwidth part may comprise one or more filtering parameters and the one or more filtering parameters may comprise one or more of N310, N311, and N313, N314 counters. In certain embodiments, the one or more configuration parameters for performing radio link monitoring within its associated bandwidth part may comprise one or more radio link failure timers and the one or more radio link failure timers may comprise one or more of T310, T311, T313, and T314 timers.

In certain embodiments, at least one of the determined one or more radio link monitoring configurations may comprise a default radio link monitoring configuration. In certain embodiments, the default radio link monitoring configuration may be associated with a default bandwidth part.

In certain embodiments, the radio link monitoring configuration associated with the target bandwidth part may comprise a plurality of sets of radio resources, and the method may further comprise configuring the UE to select one or more of the plurality of sets of radio resources to use to perform radio link monitoring on the target bandwidth part based on a pre-defined rule.

In certain embodiments, a plurality of radio link monitoring configurations may be associated with the target bandwidth part, and the method may further comprise sending an instruction to the UE to use one of the plurality of radio link monitoring configurations to perform radio link monitoring on the target bandwidth part.

In certain embodiments, a radio link monitoring configuration associated with a source bandwidth part and the radio link monitoring configuration associated with the target bandwidth part may use the same radio resources, and configuring the UE to perform radio link monitoring on the target bandwidth part according to the radio link monitoring configuration associated with the target bandwidth part may comprise configuring the UE to use one or more of previously-performed measurements and previously-performed measurement samples to generate out-of-sync and in-sync events.

In certain embodiments, a radio link monitoring configuration associated with a source bandwidth part and the radio link monitoring configuration associated with the target bandwidth part may use different radio resources. In certain embodiments, configuring the UE to perform radio link monitoring on the target bandwidth part according to the radio link monitoring configuration associated with the target bandwidth part may comprise configuring the UE to apply a relation function to one or more previously-performed measurements and previously-performed measurement samples to generate out-of-sync and in-sync events without resetting a radio link failure timer or a radio link failure counter. In certain embodiments, configuring the UE to perform radio link monitoring on the target bandwidth part according to the radio link monitoring configuration associated with the target bandwidth part may comprise configuring the UE to reset at least one of a radio link failure timer and a radio link failure counter. In certain embodiments, configuring the UE to reset at least one of a radio link failure timer and a radio link failure counter may comprise configuring the UE to reset a set of radio link failure timers and radio link failure counters associated with radio link monitoring for out-of-synch events and configuring the UE to allow a set of radio link failure timers and radio link failure counters associated with radio link monitoring for in-synch measurements to continue. In certain embodiments, configuring the UE to reset at least one of a radio link failure timer and a radio link failure counter may comprise configuring the UE to reset one or more radio link failure timers without resetting any radio link failure counters.

Also disclosed is a network node. The network node comprises a receiver, a transmitter, and processing circuitry coupled to the receiver and the transmitter. The processing circuitry is configured to determine one or more radio link monitoring configurations, each radio link monitoring configuration associated with at least one bandwidth part. The processing circuitry is configured to configure a UE to perform radio link monitoring on a target bandwidth part according to a radio link monitoring configuration associated with the target bandwidth part.

Also disclosed is a computer program, the computer program comprising instructions configured to perform the above-described method in a network node.

Also disclosed is a computer program product, the computer program product comprising a non-transitory computer-readable storage medium, the non-transitory computer-readable storage medium comprising a computer program comprising computer-executable instructions which, when executed on a processor, are configured to perform the above-described method in a network node.

Certain embodiments of the present disclosure may provide one or more technical advantages. For example, certain embodiments may advantageously enable an efficient change in radio link monitoring/radio link failure configuration when the UE changes bandwidth part. This may advantageously allow frequent measurement gaps to be avoided without excessive additional signaling. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 15 is a flowchart of a method implemented in a communication system, in accordance with certain embodiments:

FIG. 16 is a flowchart of a method implemented in a communication system, in accordance with certain embodiments;

FIG. 17 is a flowchart of a method implemented in a communication system, in accordance with certain embodiments; and FIG. 18 is a flowchart of a method implemented in a communication system, in accordance with certain embodiments.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As described above, in NR RLM can be performed by configuring PBCH/SS Blocks or CSI-RS resources, and for a given cell there will be only one PBCH/SS Block (which might not fall within the active BWP). As a result, there are certain problems for RLM configuration that may occur in the context of BWPs. For example, when changing BWP, the UE may need to use measurement gaps to perform RRM measurements even for the serving cell in cases where RRM measurements are configured to be based on PBCH/SS Blocks and the PBCH/SS Block for the serving cell is not within the active BWP the UE is switching to.

For RRM measurements on the serving cell, measurement gaps could be used as in LTE Cat-M1 UEs. RLM measurements used to compute the SINR (to then map to a Qout/Qin threshold relative to a mapped BLER so that IS/OOS events can be generated), however, should be performed much more often than RRM measurements (in LTE on the order of 4 times as often). In other words, while RRM measurements are typically performed every 40 ms, RLM measurements are performed per radio frame (i.e., every 10 ms). That would mean using extremely frequent measurement gaps (for example in configurations where the RS type and/or frequency resources to be monitored for RLM are outside the active BWP), which is not viable. The impact that the placement of the PBCH/SS Block can have on the need for measurement gaps is illustrated in FIGS. 5A and 5B, which are described in more detail below.

Figure 1:
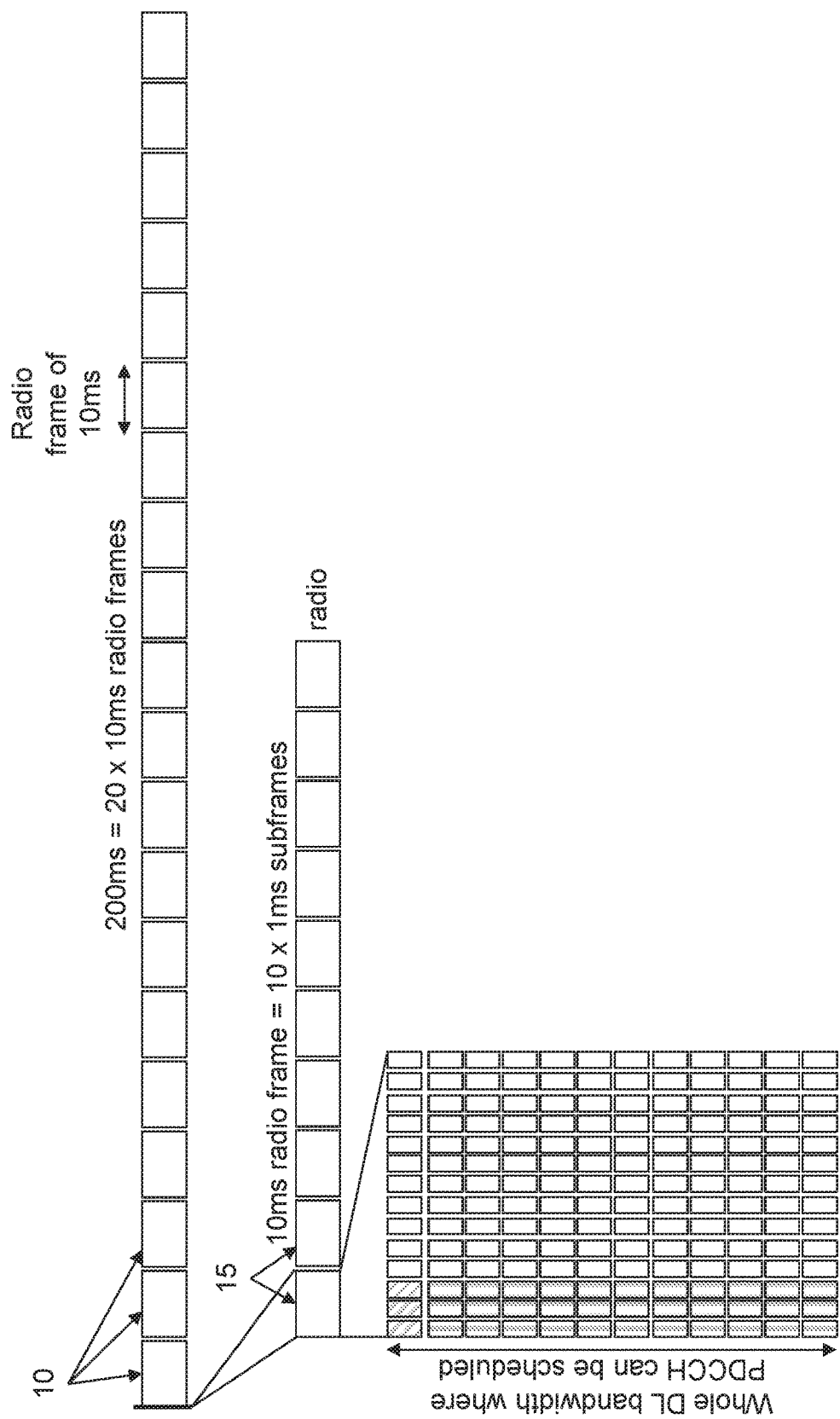
FIG. 1 illustrates an example of how PDCCH can be scheduled over the whole DL transmission bandwidth.
Figure 2:
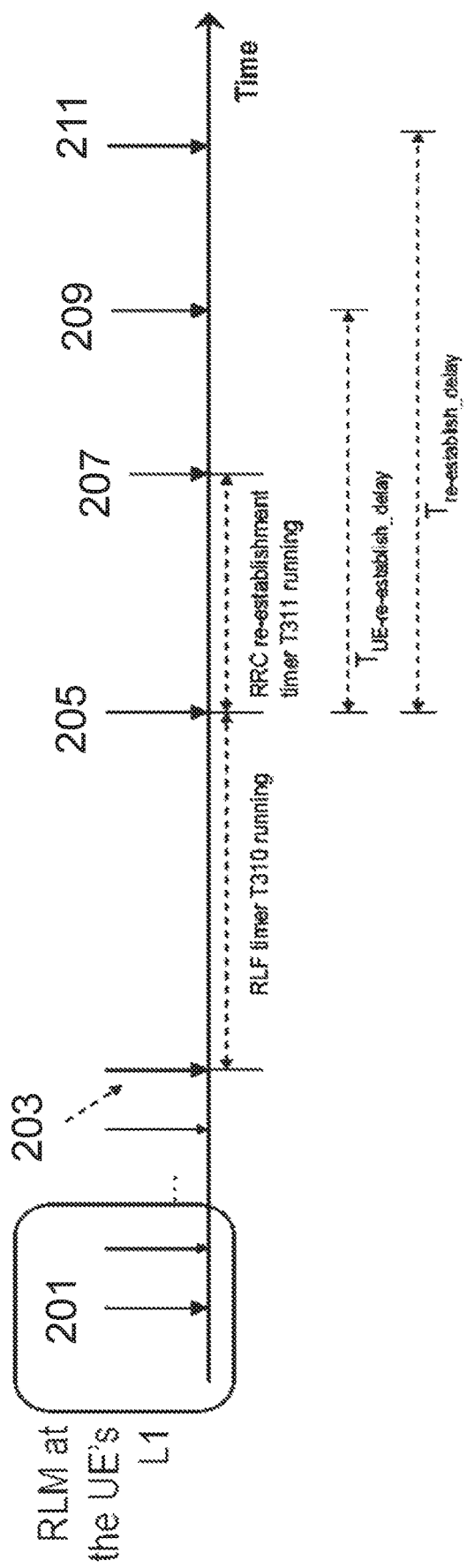
FIG. 2 illustrates an example procedure for evaluating RLF.
Figure 3:
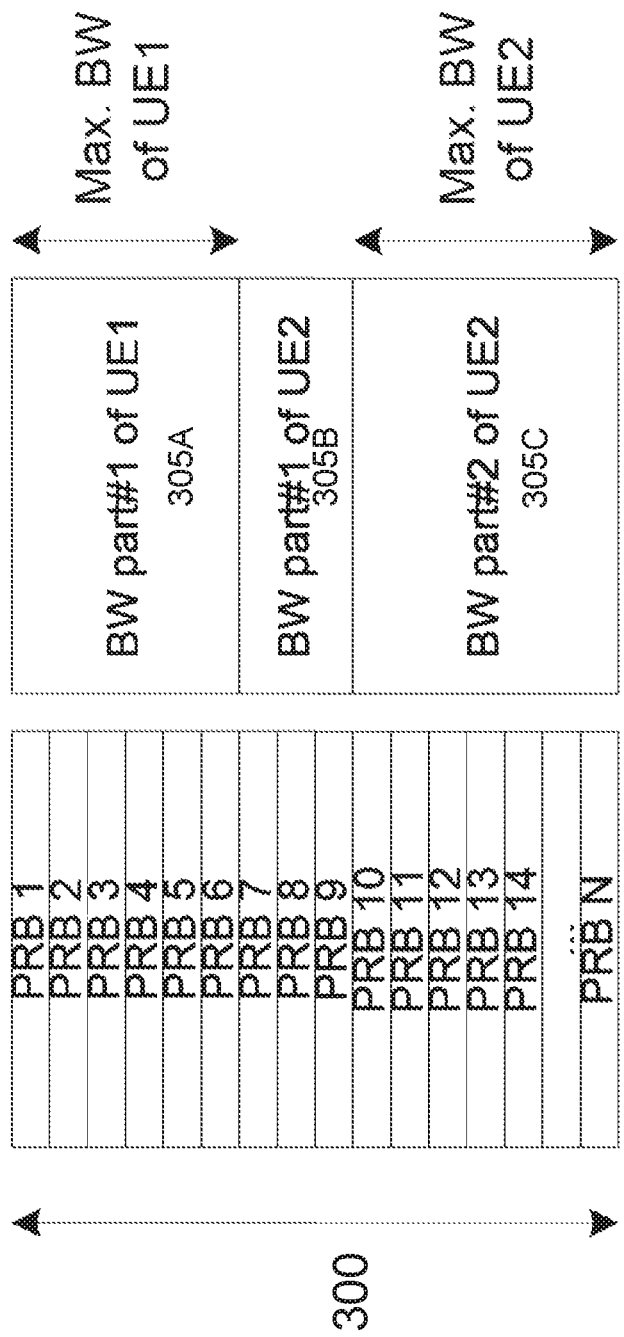
FIG. 3 illustrates an example of bandwidth parts.
Figure 4:
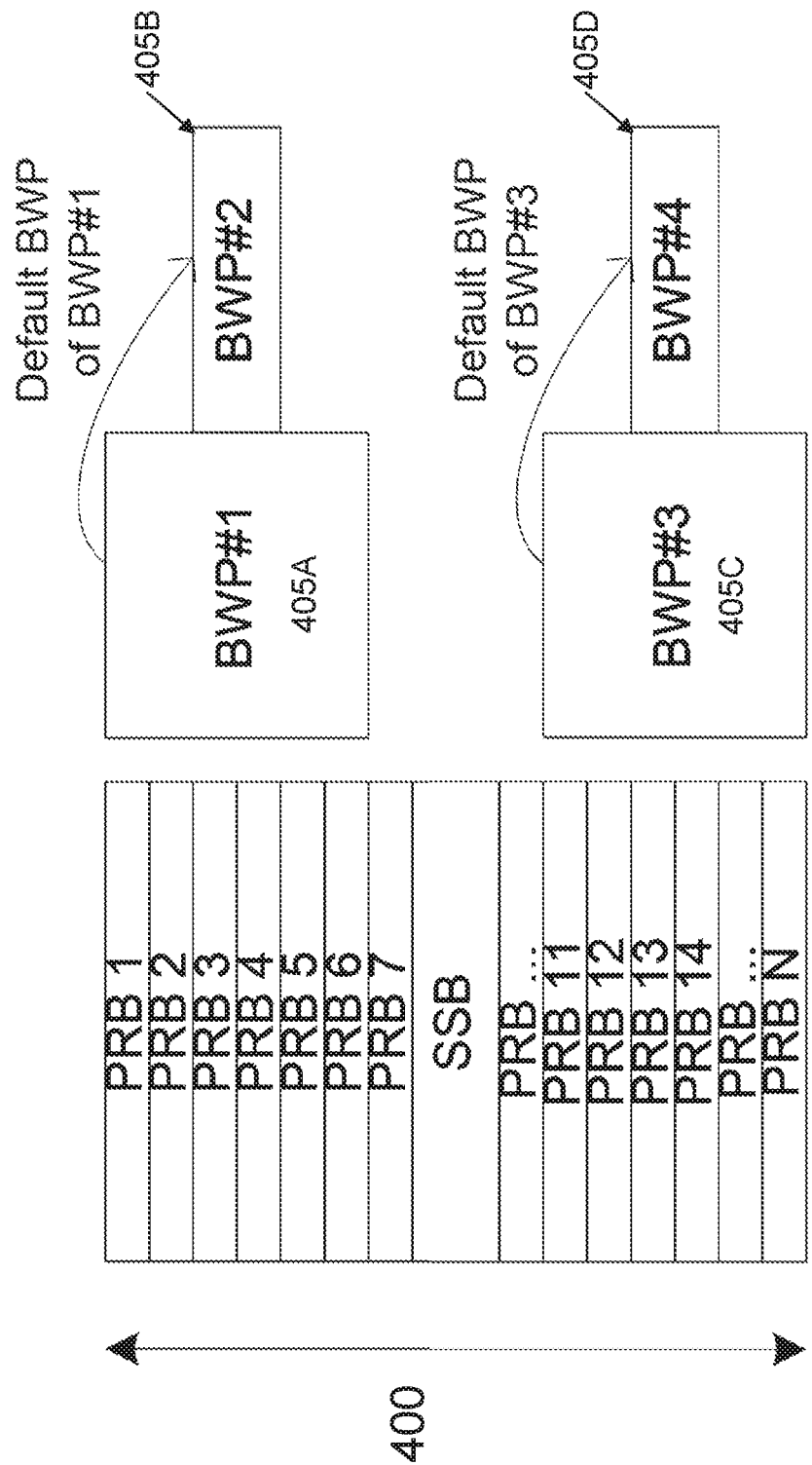
FIG. 4 illustrates an example of default bandwidth parts.
Figure 5:
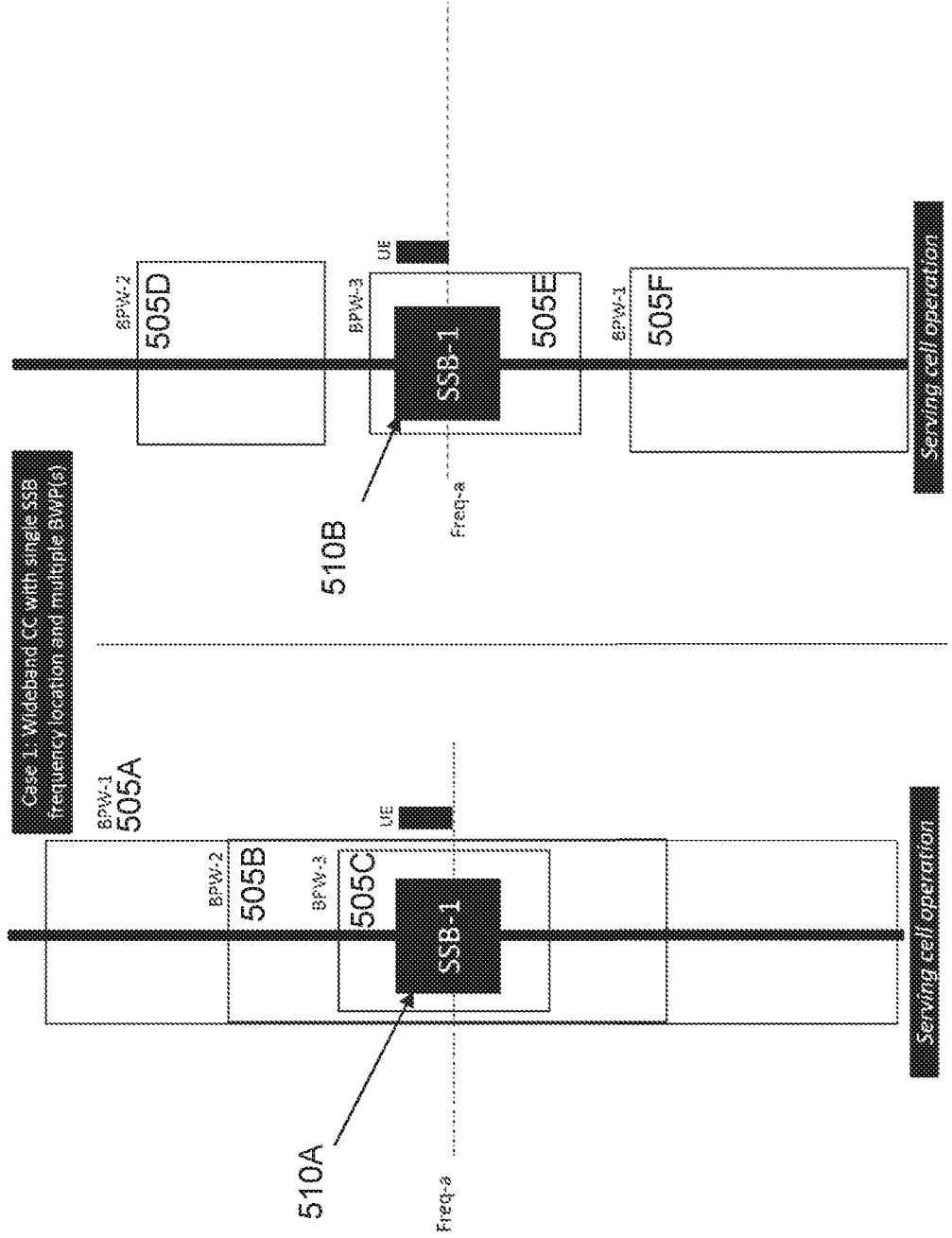
FIGS. 5A and 5B illustrate a wideband component carrier with a single SSB frequency location and multiple bandwidth parts.

FIGS. 5A and 5B illustrate a wideband component carrier with a single SSB frequency location and multiple BWPs. In FIG. 5A, three BWPs 505A, 505B, and 505C are illustrated. Additionally, there is a single SSB 510A. As can be seen from FIG. 5A, SSB 510A falls within each of BWPs 505A, 505B, and 505C. Thus, when switching between BWPs 505A, 505B, and 505C (for example via L1 signaling), there is no need to re-configure RRM measurements when switching BWPs. Thus, there is no need for gaps in the scenario illustrated in FIG. 5A.

FIG. 5B, meanwhile, illustrates three BWPs 505D, 505E, and 505F. FIG. 5B also depicts a single SSB 510B. In contrast to the scenario illustrated in FIG. 5A, in FIG. 5B only one of the BWPs, BWP 505E, includes SSB 510B. Thus, when switching between BWPs (for example via L1 signaling), if the active BWP is re-configured to be BWP 505D or BWP 505F, a UE may need gaps (i.e., reconfiguration upon BWP switching is needed or at least the UE should start to use gaps previously configured (activation of a previously configured gap)). For RLM, this would occur too frequently and would not be not very efficient, especially if SSB 510B is used for RLM.

In addition to needing to use measurement gaps to perform RRM measurements as described above, there are other problems for RLM configuration that may occur in the context of BWPs. As an additional example, changing BWP may lead to changes in the RLM resources the UE monitors (especially if the PDCCH configuration also changes). As another example, there could be a need to change the RS type the UE monitors, as the target active BWP may not include the RS type/resources the UE was monitoring in the previous active BWP. As yet another example, there may also be a change in the number of RLM resources.

A possible alternative could be to rely on RRC signaling (e.g., RRC Connection Reconfiguration) for scenarios in which the target BWP to become active does not include the resources the UE was monitoring for RLM purposes in the source BWP. That would mean, however, that every time there is a change from a source BWP to a target BWP (whether done via L1 signaling or based on the timer RAN1 has agreed to) RRC signaling will be needed. This defeats the purpose of the signaling optimization for BWP switching.

Additionally, the relation (and thus the mapping) between a measured channel quality (e.g., SINR) and the hypothetical control channel BLER may be different depending on the BWP. Furthermore, an old BWP may contain SS Blocks and thus SS Block-based RLM may be configured, while a new BWP may not contain SS Blocks and therefore CSI-RS-based RLM (where CSI-RS are contained within the new BWP) may be more useful.

Certain aspects of the present disclosure and the embodiments described herein may provide solutions to these or other challenges. According to one example embodiment, a method in a wireless device (WD) (e.g., a UE) is disclosed. The WD obtains one or more RLM configurations, each RLM configuration associated with at least one BWP. In certain embodiments, the WD may obtain the one or more RLM configurations by receiving the one or more RLM configurations in a message from a network node (e.g., a gNB). In certain embodiments, the WD may obtain the one or more RLM configurations by determining the one or more RLM configurations according to one or more pre-defined rules. In certain embodiments, each RLM configuration may comprise a set of radio resources for performing RLM within its associated BWP and one or more configuration parameters for performing RLM within its associated bandwidth part. The WD determines that the WD is to switch from a source BWP to a target BWP. The WD performs RLM on the target BWP according to an obtained RLM configuration associated with the target BWP.

According to another example embodiment, a method in a network node (e.g., a gNB) is disclosed. The network node determines one or more RLM configurations, each RLM configuration associated with at least one BWP. The network node configures a WD to perform RLM on a target BWP according to a RLM configuration associated with the target BWP. In certain embodiments, the network node may send an indication of the RLM configuration associated with the target BWP to the WD (e.g., in an IE within a BWP configuration for the target BWP and/or in an IE within a serving cell configuration). In certain embodiments, the indication may comprise a RLM configuration identifier.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 6:
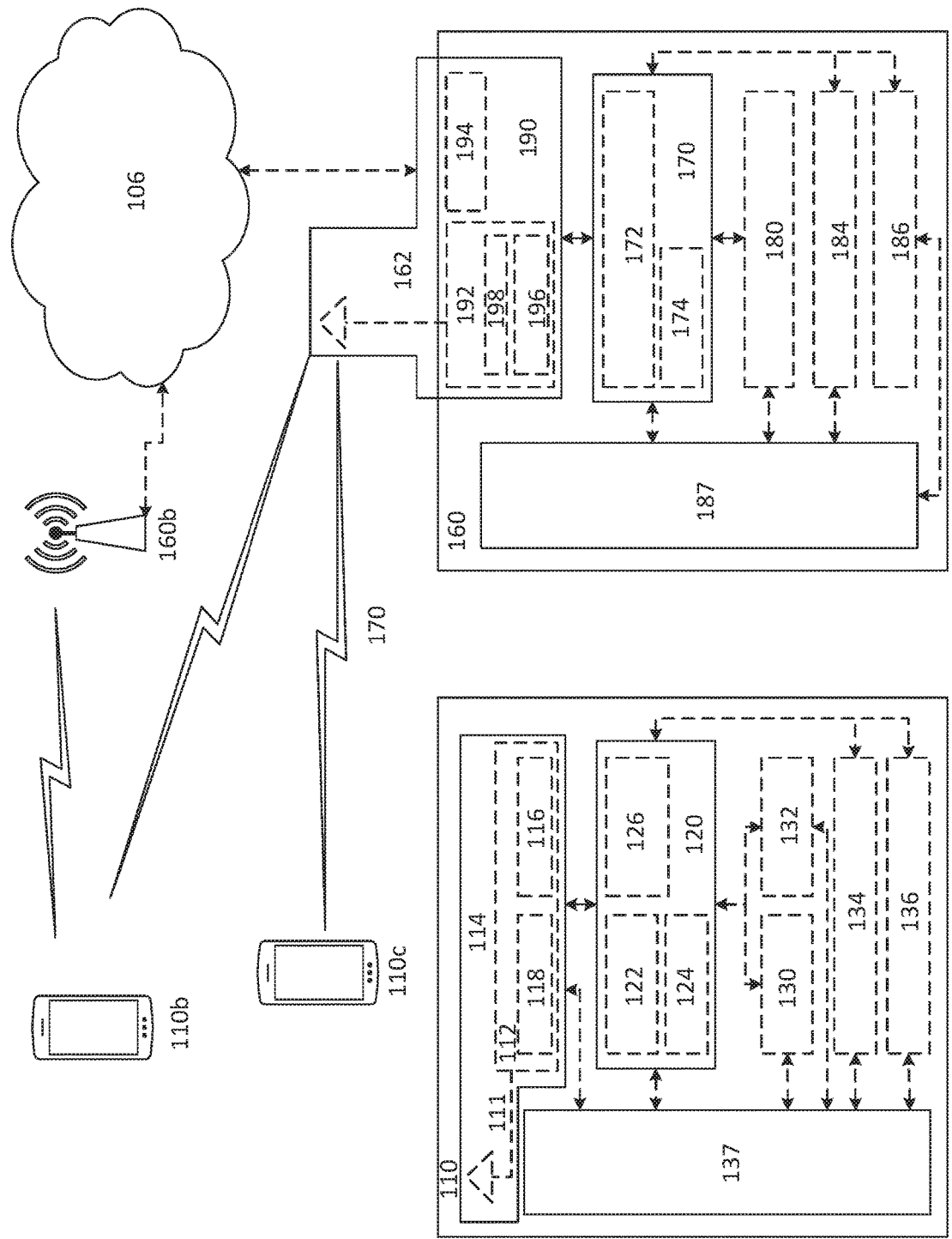
FIG. 6 illustrates an example wireless communications network, in accordance with certain embodiments.

FIG. 6 illustrates an example wireless communications network, in accordance with certain embodiments. Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 106, network nodes 160 and 160b, and wireless devices (WDs) 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and WD 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs)(e.g., radio base stations. Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O & M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 160 includes processing circuitry 170, device readable medium 180, interface 190, auxiliary equipment 184, power source 186, power circuitry 187, and antenna 162. Although network node 160 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 6 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g.

refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source: in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

As described above, in NR WD 110 may be required to switch from a first BWP (i.e., a source BWP) to a second BWP (i.e., a target BWP). The need for WD 110 to switch BWP may cause problems with respect to RLM and RLF, such as those described above. As described in detail below, the various embodiments described herein relate to actions performed by a WD (e.g., WD 110) and the network (e.g., network node 160) in the context of RLM configuration and RLF upon BWP switching that may solve these and/or other problems related to BWP switching.

In certain embodiments, WD 110 (e.g., a UE) obtains one or more RLM configurations. Each RLM configuration may be associated with at least one BWP. For example, the one or more RLM configurations may include an RLM configuration associated with a target BWP. In certain embodiments, network node 160 (e.g., a gNB) may determine the one or more RLM configurations.

WD 110 may obtain the one or more RLM configurations in any suitable manner. As one example, WD 110 may be configured by network node 160 with one or more RLM configurations. For instance, WD 110 may obtain the one or more RLM configurations by receiving the one or more RLM configurations in a message from network node 160. In some cases, the message from network node 160 may be sent as part of network node 160 configuring WD 110 to perform RLM on a BWP (e.g., a target BWP) according to an RLM configuration associated with that BWP. In certain embodiments, the message may include an indication of the RLM configuration associated with that BWP. In some cases, the indication may be included in an IE within a BWP configuration for the BWP. In some cases, the indication may be included in an IE within a serving cell configuration. In some cases, the indication may comprise a RLM configuration identifier.

As another example, WD 110 may obtain the one or more RLM configurations by determining the one or more RLM configurations (e.g., according to one or more pre-defined rules). For instance, WD 110 may determine one or more RLM configuration parameters. In some cases, the determination may be based on an active BWP or a set of active BWPs. In certain embodiments, network node 160 may configure WD 110 to determine the RLM configuration associated with a BWP according to the one or more pre-defined rules.

In certain embodiments, one of the obtained RLM configurations may be an active RLM configuration. In certain embodiments, WD 110 may determine that one of the RLM configurations is an active RLM configuration. WD 110 may determine that one of the RLM configurations is an active RLM configuration in any suitable manner. As one example, WD 110 may be configured by network node 160 with an active RLM configuration. In other words, one of the obtained one or more RLM configurations may be configured by network node 160 as an active RLM configuration. As another example, WD 110 may determine the active RLM configuration (e.g., based on a pre-defined rule).

In certain embodiments, one of the obtained one or more RLM configurations may be a default RLM reconfiguration. The default RLM configuration may be configured by the network (e.g., by network node 160), specified by the standard, and/or determined by the WD 110 (for example, based on a pre-defined rule). In some cases, the default RLM configuration may be associated with a default BWP. In some cases, the default RLM configuration may not be associated with a default BWP.

Each RLM configuration may include information related to RLM. In general, each RLM configuration includes a set of radio resources for performing radio link monitoring within its associated BWP as well as one or more configuration parameters for performing RLM within its associated BWP. Examples of radio resources include CSI-RS resource, SSB (also known as SS/PBCH Block or SS Block), or other radio resources suitable for RLM. Examples of configuration parameters for performing RLM that may be included in the RLM configuration are filtering parameters (e.g., the N310, N311, N313, N314 counters or another suitable counter), RLF timer(s) (e.g. the T310. T311, T313, T314 RLF timers or another suitable timer), an evaluation period, a number of retransmissions before RLF is declared, a hypothetical channel/signal configuration, a mapping function between the measured link quality and hypothetical channel BLER, or other suitable configuration parameters. The information that may be included in an RLM configuration is described in more detail below.

In certain embodiments, each RLM configuration may include one or a combination of the following types of information.

Each RLM configuration may include the RS type(s) that should be monitored for RLM (i.e., PBCH/SS Block, CSI-RS or a combination of CSI-RS resources and SSB resources).

Each RLM configuration may include the specific resources for the configured RS type to be monitored for RLM. As one example for cases in which CSI-RS resources are used, each RLM configuration may include the specific RLM CSI-RS resources in time/frequency and the exact sequence. As another example for cases in which SS/PBCH Block resources are used, each RLM configuration may include the specific SS/PBCH Block indexes. In certain embodiments, the specific SS/PBCH Block indexes may be derived by WD 110. In certain embodiments, the specific SS/PBCH Block indexes may be explicitly indicated. As another example for cases in which a combination of SSB and CSI-RS resources are used, each RLM configuration may include the combination of SSB and CSI-RS resources (e.g., the specific RLM CSI-RS resources in time/frequency and the exact sequence as well as the specific SS/PBCH Block indexes).

Each RLM configuration may include link and/or channel quality related thresholds (e.g., SINR thresholds and/or a pair of BLER thresholds for IS and OOS event generation). These parameters may change when BWPs are changed.

Each RLM configuration may include one or more RLM/RLF-related timers or counters (e.g., the T310 timer and the N310 counter). Other timers and counters may be included in addition (or as an alternative), such as the other types of timers and counters described herein.

Each RLM configuration may include one or more parameters that determine the mapping between SINR and BLER, or a mapping function, mapping rule, or mapping table. Note that the mapping to be used by WD 110 may be explicitly configured or controlled by the network (e.g., by network node 160).

Each RLM configuration may include a compensation factor to be applied to SINR prior to mapping to a channel quality (e.g., a hypothetical control channel BLER). In certain embodiments, the compensation factor may depend, for example, on one or more of the BWP, type of RLM resources, BLER, measurement bandwidth for RLM, numerology (such as subcarrier spacing, symbol length, or cyclic prefix (CP) length), frequency, and other suitable criteria.

Each RLM configuration may include a link evaluation period for RLM and/or the number of samples to be used for the link evaluation.

Each RLM configuration may include one or more configuration parameters of the hypothetical channel (e.g., a hypothetical PDCCH), such as one or more of bandwidth, aggregation level, DCI size, a number of symbols, a ratio of control channel energy to SSS resource element (RE) energy, or other suitable configuration parameters.

In certain embodiments, the WD 110 may obtain an RLF/SCG failure configuration. In some cases, the RLF/SCG failure configuration may be included in the RLM configuration. In some cases, the RLF/SCG failure configuration may be separate from the RLM configuration. In such a scenario, WD 110 may obtain the RLF/SCG failure configuration in a similar manner to that described above with respect to WD 110 obtaining the one or more RLM configurations. In certain embodiments, each RLF/SCG failure configuration may include one or more of the following: timers (e.g., one or more of timers T310, T311, T313, T314); and counters (e.g., one or more of counters N310, N311, N313, N314).

In certain embodiments, WD 110 determines that WD 110 is to switch from a source BWP to a target BWP. For example, WD 110 may receive an instruction to switch from a source BWP to a target BWP (e.g., via DCI). WD 110 performs RLM on the target bandwidth part according to an obtained RLM configuration associated with the target BWP. In certain embodiments, upon activating a new BWP. WD 110 may activate a previously configured RLM configuration based on various rules and/or criteria.

In one example embodiment, one or more of the target BWP and the source BWP may be a DL BWP (e.g., for a paired spectrum or FDD). In another example embodiment, one or more of the target BWP and the source BWP may be a DL/UL BWP (e.g., for unpaired spectrum or TDD), where the DL BWP and UL BWP have the same frequency center and are activated simultaneously, even though they may have the same or different bandwidth. In yet another example embodiment, one or more of the target BWP and the source BWP may be an UL BWP, which potentially may also impact how RLM/RLF is configured.

To illustrate the above, a specific example embodiment will now be described. WD 110 may obtain K1 RLM configurations that are associated to K2 BWP configurations (e.g., RLM configuration k1* is associated to the BWP configuration k2*). As described above. WD 110 may obtain the K1 RLM configurations based on a message received from network node 160 and/or determine the K1 RLM configurations (e.g., based on a predefined rule). WD 110 may determine (e.g., derive based on a pre-defined rule or the standard or select from a set of pre-defined values) at least one RLM configuration parameter for at least one RLM configuration out of the K1 RLM configurations. Upon triggering the activation of a given BWP (e.g., k2*), WD 110 activates the associated RLM configuration, k1*.

The RLM and BWP configurations may be associated in a variety of ways. As a first example, each RLM configuration can be provided as an IE within each BWP configuration. As a second example, each RLM configuration can be provided as an IE within the serving cell configuration and associated with an RLM configuration identifier, where only the RLM configuration identifier is part of each BWP configuration IE This advantageously allows RLM configurations to be efficiently conveyed in RRC signaling. As a third example, each RLM configuration can be provided as an IE within the serving cell configuration, and there may be a list of BWP IDs within each RLM configuration IE. The RLM configuration per BWP may be OPTIONAL fields in the BWP configuration in any of the above-mentioned cases. In other words, there can be a cell-based default RLM configuration that is assumed if WD 110 is switched to a BWP without the RLM configuration.

The configurations of the source (i.e., old) BWP and target (i.e., new active) BWP may be the same or different in terms of RS type. Different combinations may exist as described in more detail below. As a first example, the RLM configuration associated with the source BWP configuration may define RS Type=SS Block and the RLM configuration associated with the target BWP configuration may also define RS Type=SS Block. In some cases, the new (i.e., target) SSB for RLM measurements may be in the same frequency position as the old (i.e., source) SSB. In some cases, the new SSB for RLM measurements may be in a different frequency position than the old SSB. In some cases, the new SSB for RLM measurements may have the same time-domain pattern as the old SSB. In some cases, the new SSB for RLM measurements may have a different time-domain pattern than the old SSB. In some cases, the new SSB for RLM measurements may have the same physical cell identifier (PCID) as the old SSB. In some cases, the new SSB for RLM measurements may have a different PCID than the old SSB. In some cases, the new SSB for RLM measurements may define the same RLM resources (i.e., SSB indexes) as the old SSB. In some cases, the new SSB for RLM measurements may define different RLM resources (i.e., SSB indexes) than the old SSB. These can either be additional resources or fewer resources.

As a second example, the RLM configuration associated with the source BWP configuration may define RS Type=CSI-RS and the RLM configuration associated with the target BWP configuration may define RS Type=CSI-RS. In some cases, the new CSI-RS resources for RLM measurements may be in the same frequency position as the old CSI-RS resource. In some cases, the new CSI-RS resources for RLM measurements may be in different frequency position than the old CSI-RS resources. In some cases, the old and new CSI-RS configuration may define the same CSI-RS measurement bandwidths. In some cases, the old and new CSI-RS configurations may define different CSI-RS measurement bandwidths. In some cases, the new CSI-RS resource(s) for RLM measurements may have the same time-domain pattern as the old CSI-RS resource(s) for RLM. In some cases, the new CSI-RS resource(s) for RLM measurements may have a different time-domain pattern than the old CSI-RS resource(s) for RLM. In some cases, the new CSI-RS resource(s) for RLM measurements may have the same sequence as the old CSI-RS resource(s). In some cases, the new CSI-RS resource(s) for RLM measurements may have a different sequence than the old CSI-RS resource(s). In some cases, the new CSI-RS resources for RLM measurements may define the same RLM resources (i.e., CSI-RS time/frequency/sequence) as the old CSI-RS. In some cases, the new CSI-RS resources for RLM measurements may define different RLM resources (i.e., CSI-RS time/frequency/sequence) than the old CSI-RS.

In cases where the RLM RS is CSI-RS, WD 110 may be configured by the network (e.g., network node 160) with one or multiple RLM configurations based on one or multiple sets of CSI-RS resource(s), possibly allocated in different portions of the whole cell bandwidth (i.e., comprising multiple BWPs). Hence, upon switching to a new active BWP, WD 110 stops using previously-used CSI-RS resource(s) within the source BWP for RLM (i.e., WD 110 stops performing measurement(s) on the previously-used CSI-RS resource(s) and stops mapping these to the BLER thresholds to generate IS/OOS events) and starts using the configured CSI-RS resource(s) within the new BWP for RLM (i.e., WD 110 performs SINR measurements to be mapped to the configured BLER values).

In certain embodiments, multiple configured CSI-RS resources may lie within the new BWP. In such a scenario, network node 160 may configure WD 110 to select one or more sets of radio resources to use to perform RLM on the target BWP (e.g., based on a predefined rule). WD 110 may select one or more of the sets of radio resources to use to perform RLM on the target BWP (e.g., based on the pre-defined rule). WD 110 may determine which CSI-RS resources to use for RLM monitoring in any suitable manner. In certain embodiments, this determination may be based on a pre-defined rule (e.g., a rule governing which one WD 110 should use for RLM monitoring). As one example, the rule may be that the WD 110 selects the CSI-RS resource with the highest frequency component to use for RLM monitoring. As another example, the rule may be that the WD 110 performs RLM measurements across all the CSI-RS configured within the BWP. Alternatively, in certain embodiments WD 110 may be configured to arbitrarily choose one of the multiple configured CSI-RS resources for RLM monitoring.

Similarly, multiple configurations of SSBs and corresponding WD 110 behavior are feasible when the RLM RS-type is set to SSB. In other words, network node 160 may configure WD 110 to select one or more sets of radio resources (in this instance. SSB resources) to use to perform RLM on the target bandwidth part, and WD 110 may select one or more of the plurality of sets of radio resources to use to perform RLM on the target BWP part (e.g., based on a pre-defined rule such as those described above for scenarios in which multiple sets of CSI-RS resources are configured).

In certain embodiments, network node 160 may provide multiple RLM RS configurations associated with the same BWP (e.g., one or more RS configurations for each of the configured BWPs). For example, network node 160 may provide WD 110 with one RLM configuration using SSB and one RLM configuration using CSI-RS, both of which are associated with the same BWP. As another example, network node 160 may provide WD 110 with multiple RS configurations of the same RS-type (e.g., two RLM configurations that both use a CSI-RS configuration, or both use an SSB). In either example scenario, network node 160 may indicate (e.g., in the DCI ordering the BWP switch) which of the RS configurations associated with the target BWP should be used for RLM. In certain embodiments, network node 160 may also activate a corresponding RS (unless, for example, it was already activated for another WD using the same BWP).

In certain embodiments, the use of different BLER threshold configurations could be handled in a similar way. In other words, there may be multiple BLER threshold configurations associated with the same BWP, and network node 160 may provide WD 110 with an indication of which of the multiple BLER threshold configurations should be used with the BWP for RLM.

Alternatively, in certain embodiments network node 160 may provide a list of RLM RS configurations without association with BWPs. In such a scenario, network node 160 may indicate in the DCI ordering a BWP switch which of the listed RS configurations should be used for RLM in the new BWP. Different BLER threshold configurations could also be handled in the same way.

In addition to the above-described examples, there are a variety of other ways in which an RLM/RLF configuration can be associated with a BWP, including the example rules described below. These rules may be used by the network (e.g., network node 160) configuring RLM/RLF and BWPs (or the association between BWPs and RLM/RLF configurations) or by WD 110 selecting the appropriate RLM/RLF configuration upon changing the set of active BWPs. Examples of rules that may be used for associating an RLM/RLF configuration with a BWP in certain embodiments are described in more detail below.

As a first example rule, in certain embodiments RLM is based on a first bandwidth (BW1) (e.g., SSB for SSB-based RLM or CSI-RS for CSI-RS-based RLM) when a first BWP (BWP1) is active, while RLM is based on a second bandwidth (BW2) (e.g., SSB for SSB-based RLM or CSI-RS for CSI-RS-based RLM) when a second BWP (BWP2) is active. In such a scenario, the first bandwidth is less than or equal to the second bandwidth (i.e., BW1<=BW2) and the bandwidth of BWP1 is not larger than the bandwidth of BWP2.

As a second example rule, in certain embodiments a first type of RLM RS (e.g., signals comprised in SS Block) is used when the SS Block is comprised within a BWP, while a second type of RLM RS (e.g., CSI-RS) is used otherwise.

As a third example rule, in certain embodiments a first type of thresholds, timers, and/or counters is used when RLM is based on a first RLM RS type (e.g., SS Block-based), while a second type of threshold, timers, and/or counters is used when RLM is based on a second RLM RS type (e.g., CSI-RS).

As a fourth example rule, in certain embodiments a first compensation factor is applied when a first BWP is active, while a second compensation factor is applied when a second BWP is active. In such a scenario, at least one of the first and the second compensation factors changes the RLM measurement (e.g., SINR) to a different value (e.g., non-zero compensation factor if it is added to SINR or not equal to 1 if it scales the SINR).

As a fifth example rule, in certain embodiments a first set of configuration parameters (e.g., bandwidth, aggregation level, DCI size, number of symbols, ratio of control channel energy to SSS RE energy, etc.) of the hypothetical channel (e.g., hypothetical control channel) is used when a first BWP is active, while a second set of configuration parameters of the hypothetical channel is used when a second BWP is active.

As a sixth example rule, in certain embodiments a longer RLM evaluation period for a first RLM RS (e.g., with a more sparse RE structure in time and/or frequency) and a shorter RLM evaluation period for a second RLM RS (e.g., with a more dense RE structure in time and/or frequency) are used for the same BLER. Furthermore, in certain embodiments the evaluation period may restart upon changing the RLM RS due to BWP change, while the RLM/RLF related timers and counters may continue.

As a seventh example rule, in certain embodiments the evaluation period is extended if the bandwidth of the hypothetical channel and/or BWP is reduced, while the evaluation period is reduced if the bandwidth of the hypothetical channel and/or BWP increases. In certain embodiments, the evaluation period may be the longest between the evaluation periods corresponding to the new and old BWP during the transition time (i.e., when the evaluation period does not restart upon the BWP change).

As described above, performing RLM entails using measurements to generate OOS and IS events. In certain embodiments, WD 110 may perform specific actions related to measurements when it needs to change BWP. These actions may relate to, for example whether (and how) measurements performed in a previous BWP can be used in a newly activated BWP, how the OOS and IS events generated in the previous BWP can be used, and how the WD 110 and network node 160 manage counters (e.g., the N310, N311, N313, N314 counters) and timers (e.g., the T310, T311, T313 and T314 timers) for these events. Various example embodiments related to how WD 110 handles its measurements when it changes BWP are described in detail below.

For example, in some cases the hypothetical channel configuration used for RLM may be different for the new BWP. In such a scenario, WD 110 may update the hypothetical channel configuration used for RLM. Similarly, other variables such as the RLM measurement bandwidth, the BLER or BLER pair used for RLM, the compensation factor, and the mapping between an RLM measurement (e.g., SINR) and BLER may be different for the new BWP. If the RLM measurement bandwidth is different for the new BWP, WD 110 may change its RLM measurement bandwidth. If the BLER or BLER pair used for RLM are different for the new BWP, WD 110 may update the BLER or BLER pair used for RLM. If the compensation factor for the new BWP is different, WD 110 may apply a different compensation factor. If the mapping between an RLM measurement and BLER is different for the new BWP, WD 110 may use a new mapping between an RLM measurement and BLER.

As another example, in some cases the evaluation period for the newly active BWP may be different. In such a scenario. WD 110 may change the RLM evaluation period. For instance, the evaluation period may be changed as described above in relation to the sixth and seventh example rules for associating an RLM/RLF configuration with a BWP.

In some cases, the same RS type and resources may be used in the newly active BWP (i.e., target BWP). In such a scenario. WD 110 may continue using previously-performed measurements or measurement samples to generate OOS and IS events (i.e., WD 110 keeps counting). In certain embodiments, WD 110 maintains the counter variables (e.g., N310, N311, N313, N314). Thus, the counter variables keep increasing/decreasing based on the generated OOS and/or IS events. In other words, from a higher layer perspective how IS/OOS events are generated remains transparent. In certain embodiments, network node 160 may configure WD 110 to use one or more of previously-performed measurements and previously-performed measurement samples to generate OOS and IS events when the same RS type and resources are used in the newly active BWP.

In some cases, however, RLM measurements may not be able to be reused when a new BWP is activated. If the RLM measurements cannot be reused when a new BWP is activated, WD 110 may restart one or more timers or counters. Otherwise (i.e., if the RLM measurements can be reused), WD 110 may continue using at least one of the timers or counters (e.g., as described above).

When different resources are used in the newly active BWP, there are a variety of ways in which WD 110 can handle the counters and timers used for generating IS/OOS events. Different example embodiments detailing ways in which WD 110 behaves when different resources are used in the newly active BWP are described in more detail below.

In one example embodiment, if different RLM RS are used for different BWPs, WD 110 applies a relation function to measurements to allow the RLM evaluations to continue and to allow for continuing the timers and counters. In one example, the relation function may be an offset applied to SINR based on a first RLM RS compared to that based on a second RLM RS. In certain embodiments, network node 160 may configure WD 110 to apply a relation function to one or more previously-performed measurements and previously-performed measurement samples to generate OOS and IS events without resetting a RLF timer or a RLF counter when different RLM RS are used in the newly active BWP.

In another example embodiment, WD 110 resets at least one of the timers or counters when the RLM RS is different upon a change of BWP. In certain embodiments, network node 160 may configure WD 110 to reset at least one of a RLF timer and a RLF counter when different resources are used in the newly active BWP.

In another example embodiment, WD 110 resets one set of timers and counters (e.g., for RLM OOS) and allows another set of timers and counters to continue (e.g., for RLM IS). In certain embodiments, network node 160 may configure WD 110 to reset a set of RLF timers and RLF counters (e.g., for OOS events) and configure WD 110 to allow a set of RLF timers and RLF counters (e.g., for IS events) to continue when different RLM RS are used in the newly active BWP.

In another example embodiment, WD 110 allows the timers to continue but not the counters. In certain embodiments, network node 160 may configure WD 110 to reset one or more RLF timers without resetting any RLF counters when different RLM RS are used in the newly active BWP.

In another example embodiment, WD 110 applies an offset (e.g., to extend the time or increase the number of allowed RLM physical layer reports before triggering an action) to at least one counter or timer. In certain embodiments, network node 160 may configure WD 110 to apply an offset to at least one counter or timer when different RLM RS are used in the newly active BWP.

As described above, WD 110 may obtain an RLF/SCG failure configuration, and each RLF/SCG failure configuration may include one of the following or a combination of these parameters: timers (e.g., one or more of timers T310, T311, T313, T314); and counters (e.g., one or more of counters N310, N311, N313, N314). Various embodiments related to the configuration of the RLF/SCG failure parameters are described in more detail below.

In some cases, at least one of the timers that trigger RLF or SCG Failure (e.g., timer T310 or T313) may be running when a BWP switching is triggered. Various example actions that may be performed by WD 110 if any of the timers that trigger RLF or SCG Failure are running when BWP switching is triggered are described in more detail below. For purposes of the following examples, it should be assumed that one of the timers that trigger RLF or SCG failure are running when BWP switching is triggered.

As a first example, in some cases the RLM RS type may be SSB in both the old (i.e., source) BWP and the new (i.e., target) BWP, and the new BWP may have no new SSB associated to it within the newly active BWP. In other words, WD 110 may be configured to continue using the same SSB for RRM measurements and RLM. In such a scenario, in certain embodiments WD 110 performs the following actions: WD 110 does not reset the timer(s); WD 110 does not discard previously-performed measurements; WD 110 does not discard previously-generated IS/OOS events; and WD 110 continues incrementing the counter(s).

As a second example, in some cases the RLM RS type in the old BWP may have been either SSB or CSI-RS and the RLM RS type may be SSB in the new BWP. Additionally, the new BWP may have a new SSB associated with it within the newly active BWP to be used for RRM measurements and/or RLM. In such a scenario, in certain embodiments WD 110 performs the following actions: WD 110 resets the timer(s); WD 110 discards previously-performed measurement(s); WD 110 discards previously-generated IS/OOS event(s); and WD 110 resets the counter(s).

As a third example, in some cases the RLM RS type may be CSI-RS in both the old and the new BWP, and the new BWP may have no new CSI-RS configuration associated to it within the newly active BWP. In other words, WD 110 may be configured to continue using the same CSI-RS configuration for RRM measurements and RLM. In such a scenario, in certain embodiments WD 110 performs the following actions: WD 110 does not reset the timer(s); WD 110 does not discard previously-performed measurement(s); WD 110 does not discard previously-generated IS/OOS event(s); and WD 110 keeps incrementing the counter(s).

As a fourth example, in some cases the RLM RS type in the old BWP may have been either SSB or CSI-RS, and the RLM RS type may be CSI-RS in the new BWP. Additionally, the new BWP may have a new CSI-RS configuration associated with it within the newly active BWP. In such a scenario, in certain embodiments WD 110 performs the following actions: WD 110 does not reset the timer(s); WD 110 does not discard previously-performed measurement(s); WD 110 does not discard previously generated IS/OOS event(s); WD 110 keeps incrementing the counter.

As a fifth example, in some cases the RLM RS type in the old BWP may have been either SSB or CSI-RS, and the RLM RS type may be CSI-RS in the new BWP. Additionally, the new BWP may have a new CSI-RS configuration associated with it within the newly active BWP. In such a scenario, in certain embodiments WD 110 performs the following actions: WD 110 resets the timer(s); WD 110 discards previously-performed measurement(s); WD 110 discards previously generated IS/OOS event(s); and WD 110 resets the counter(s).

Note that with respect to the various example embodiments described above related to actions performed by WD 110 when at least one of the timers that trigger RLF or SCG failure are running when BWP switching is triggered, the actions described as performed by WD 110 may be performed in any order and the present disclosure is not limited to performing the actions in the order described above.

Moreover, the above-described actions that may be performed by WD 110 in certain scenarios are not intended to be limiting or exhausting. In some cases, other actions by WD 110 may be appropriate in conjunction with WBP switching for different RLM RS type cases. Thus, in certain embodiments the opposite behavior (or variations in the above-described example embodiments) may be used in some switching cases. Hence, in other embodiments, when WD 110 switches from one BWP to another, where the new BWP has a new RS type or a new configuration for the same RS type, WD 110 may keeps timer(s) and counter(s) running and keep previously-performed measurement(s) and previously generated IS/OOS event(s). In certain embodiments, this could be broken down in finer granular embodiments. For example, WD 110 may keep timer(s), counter(s), measurement(s) and event(s) if the RS type is the same in the new BWP, but otherwise not.

In certain embodiments, the actions taken by WD 110 on resetting the timer(s) and/or counter(s) or maintaining them based on an update to RLM resource configurations may be configured by the network. The logic behind not changing the RLM state variables is that WD 110 still remains on the same cell. Hence, if WD 110 had trouble synchronizing and had good enough channel quality in the old BWP, changing the BWP is not very likely to change that. On the other hand, as a BWP change leads to (or at least may lead to) a PDCCH configuration update (e.g., CORESET configuration update), which might change the beamforming properties of PDCCH also, the network may want to reset the state variables related to RLM and RLF.

In certain embodiments, the network (e.g., network node 160) may configure the actions to be taken by WD 110 with respect to resetting or maintaining the timer(s) and/or counter(s) (such as the various actions by WD 110 described above) in a variety of ways. In certain embodiments, the configuration of the actions performed by WD 110 could be provided when the BWPs are configured. For example, in the form of a single general action rule configuration that could be applied to all BWP switches. In certain embodiments, the general action rule configuration may specify that the same actions should be performed irrespective of BWPs involved in the switch. In certain embodiments, the general action rule configuration may specify that different actions should be performed depending on the type of BWP switch (e.g. in terms of the different scenarios above, i.e. change of RS type or not, change of RS resource configuration or not). Alternatively, in certain embodiments the network may configure separate actions associated with each configured BWP. For example, the actions associated with a particular BWP may be performed when WD 110 switches to that particular BWP. As another example, the actions associated with a particular BWP maybe performed when the UE switches from that particular BWP to another BWP. As still another example, network node 160 (e.g., a gNB) may provide a list of action configurations to WD 110. The list of action configurations may not include BWP associations. Network node 160 may indicate (e.g., in the DCI ordering a BWP switch) which of the listed action configurations WD 110 should apply in conjunction with the concerned BWP switch.

In certain embodiments, WD 110 may estimate the radio link quality to monitor the DL link quality (e.g., based on CSI-RS or SSB signals) for the purpose of RLM (e.g., for OOS and IS evaluations) in at least two different BWPs over at least a partly overlapping time period (e.g., evaluation periods). In some cases, this may be referred to herein as "parallel monitoring" or "partial parallel monitoring" of DL link qualities in different BWPs for RLM.

In some cases, the quality of a best beam at every sample may be relevant to generating OOS/IS events. Examples of OOS and IS evaluation periods for CSI-RS based RLM are 100 ms and 200 ms, respectively (e.g., when OOS/IS evaluation is based on DL link quality measured on CSI-RS). Examples of OOS and IS evaluation periods for SSB based RLM are $3*T_{SSB}$ and $6*T_{SSB}$, respectively (e.g., when OOS/IS evaluation is based on DL link quality measured on SSB signals and where $T_{SSB}$ is the SS burst periodicity configured at WD 110 for RLM.

As described in more detail below, according to one example embodiment WD 110 may perform parallel monitoring of the DL link qualities in two or more BWPs regardless of the rate with which these BWPs are activated. In another example embodiment, WD 110 may perform parallel monitoring of the DL link qualities in two or more BWPs depending on the rate at which these BWPs are activated. For example, WD 110 may perform parallel monitoring of the DL link qualities in any two BWPs provided that the UE is configured to activate each BWP for a certain time period at least once every T1 time units (e.g., T1=10 ms). For example, this rule will require WD 110 to monitor the DL link quality in two or more BWPs in parallel only if these BWPs remain active continuously for a shorter duration (e.g., shorter than the evaluation period of DL radio link quality).

In certain embodiments. WD 110 may be configured to perform parallel evaluation (i.e., during at least a partly overlapping time period) of DL link quality in two or more BWPs in parallel selectively and/or based on one or more criteria. The criteria may be any suitable criteria. Examples of criteria include but are not limited to: a duration over which the UE remains active in one or more configured BWPs: and a rate with which WD 110 is switched between different active BPWs. More specifically, WD 110 may be further configured to perform parallel evaluation of DL link quality in two or more BWPs in parallel over at least partially overlapping time period based on the duration over which one or more of the BWPs remain active for the UE.

To illustrate, consider the following example embodiment. For purposes of this example, assume that WD 110 is configured (e.g., via RRC) with two BWPs: a first BWP (BWP1) and a second BWP (BWP2). Assume further that in one time instance, WD 110 can be configured (e.g., via DCI) with only one active BWP (i.e., the activated or active BWP of WD 110 is either BWP1 or BWP2 in the current example). If WD 110 is configured with active BWP1 or active BWP2 over a duration shorter than a certain time threshold (Ta), then WD 110 may perform DL radio link monitoring of DL signals in both BWP1 and BWP2 whenever WD 110 becomes active in the respective BWP. But, if WD 110 is configured with active BWP1 or active BWP2 over a duration equal to or larger than the time threshold Ta, then WD 110 performs DL RLM of DL signals only in the BWP which remains active after Ta. Examples of Ta include 10 ms, 100 ms, etc.

In the former case (when BWP1 or BWP2 is active for less than the time threshold Ta), in certain embodiments WD 110 may further evaluate the OOS or IS detection based on a combination of the DL radio link qualities measured across BW1 and BW2. As another example, in certain embodiments WD 110 may independently evaluate OOS and IS detection based on the radio link qualities measured across BW1 and BW2. In certain embodiments, whether WD 110 should use a combined metric for OOS and IS detection or independently apply DL radio link qualities for OOS and IS detection may be pre-defined as a rule in the standard. In certain embodiments, whether WD 110 should use a combined metric for OOs and IS detection or independently apply DL radio link qualities for OOS and IS detection may be configured at the UE by network node 160 (e.g., via RRC, MAC, and/or DCI over PDCCH or some other suitable manner). Examples of metrics to obtain combination of the DL radio link qualities include but are not limited to average, maximum, minimum, or some other suitable metric. This mechanism will enhance RLM performance and lead to power saving at WD 110 since WD 110 does not need to perform parallel evaluation for OOS and IS detection in multiple BPW all the time (instead, it may do it selectively).

In certain embodiments, WD 110 may be configured with N BWPs. One of the configured N BWPs may be configured as a default BWP. In such a scenario, in certain embodiments WD 110 may always estimate the radio link quality to monitor DL link quality (e.g., based on CSI-RS or SSB signals) in the default BWP. Additionally, in certain embodiments WD 110 may monitor the radio link quality of the current active BWP when the current active BWP is not the default BWP. In some cases, a timer may be used (e.g., WD 110 may go back to the default BWP if WD 110 cannot receive DCI in the active BWP for certain time T). If WD 110 is monitoring radio link quality from two different BWPs, the OOS and IS indications may be associated with an indication (e.g., a tag) indicating which BWP caused the indication.

In certain embodiments, WD 110 may be configured to store BWP configuration information (e.g., related to RLM configuration and RLF) in the RLF report that can be transmitted to the network upon re-establishment (e.g., after RLF occurs). In certain embodiments, information may be stored when RLF occurs in a given BWP. WD 110 may include in an RLF report the BWP configuration when the RLF has occurred. In certain embodiments, WD 110 may also include other information, such as whether the RLF occurred in conjunction with a BWP switch and, if so, whether the switching was caused by a DCI signaling or a timer. In certain embodiments, the RLF report may also include information about the old BWP, in case the RLF occurred in conjunction with a switch from an old to a new BWP. In certain embodiments, some or all of this information may be included (additionally or alternatively) in an RRC Connection Re-establishment request.

In certain embodiments, network node 160 may configure WD 110 in one or more of the various ways described above. In addition to configuring WD 110 as described above, in certain embodiments network node 160 may transmit different reference signals in specific resource(s). For example, network node 160 may transmit different reference signals in specific resource(s) per configured BWP. As another example, network node 160 may activate certain reference signals upon the activation of a given BWP. For instance, in certain embodiments the transmission of the RLM RS may be triggered by the activation of the BWP for at least one WD (e.g., by the fact the network node starts to transmit PDCCH in that newly activated BWP for that WD).

The following section illustrates an example approach to how one or more of the above-described embodiments may be implemented into a standard. The description below reflects one possible approach, and the present disclosure is not limited to the examples described below. Modifications, additions, or omissions may be made to the example approach described below without departing from the scope of the present disclosure.

There are two options for how to do RLM when there are multiple BWPs configured for a UE. A first option is to monitor the current active BWP all the time. A second option is to monitor RLM dedicated BWPs. As agreed in RAN1, both SSB and CSI-RS can be configured as RLM RS. Since not each BWP can be configured with SSB however each BWP can be configured with CSI-RS, then how to do RLM could be different per RS. As agreed in RAN2, there is only one cell-defining SSB in a carrier. The cell defining SSB is considered as the time reference of the serving cell, and for RRM serving cell measurements based on SSB. If SSB is configured as RLM RS, it may be beneficial to follow similar principles as for serving cell RRM measurement. That is, cell-defining SSB is used for RLM. This means when there is no cell-defining SSB within the current active BWP, a UE has to switch to the BWP with cell-defining SSB for RLM purpose. This is also the case for RRM measurement. That is, when UE need to do serving cell RRM measurement, and SSB is not within active BWP, then the UE need to switch to the BWP with cell-defining SSB for RRM measurement. According to RAN1, measuring on a RS not within UE active BWP means a gap is needed. Thus, for SSB based RLM, RLM is in the BWP with cell-defining SSB. RLM is carried in measurement gap when active BWP does not have cell-defining SSB.

For CSI-RS based RLM, each active BWP must be configured with CSI-RS. Therefore it is quite natural that RLM is in the active BWP all the time. In other words, for CSI-RS based RLM, RLM can always be in active BWP.

Since both SSB based and CSI-RS based RLM need be supported, it is proposed that both RLM in active BWP and RLM in designated BWP should be supported and which one to choose depends on which RS is configured as RLM RS. As SSB based RLM is not BWP dependent, the configuration of RLM related parameters can be at cell level. While as CSI-RS based RLM is BWP dependent, the UE need to know the CSI-RS resource to monitor in active BWP, therefore, besides some common parameters (e.g., timers and constants that are shared by different BWP), there should be some BWP specific RLM configuration (e.g., where is the CSI-RS resource to monitor). Thus, it is proposed that CSI-RS based RLM includes both cell group and BWP specific configuration.

With respect to beam failure/recovery and RLF triggering, it should be considered whether beam failure related events can explicitly be part of it, considering the following RAN1 agreements: NR should strive to provide aperiodic indication(s) based on beam failure recovery procedure to assist radio link failure (RLF) procedure, if same RS is used for beam failure recovery and RLM procedures. As a first example, aperiodic indication(s) based on beam failure recovery procedure can reset/stop T310. As a second example, aperiodic indication(s) based on failure of beam recovery procedure. It is for further study the use of aperiodic indication(s) based on beam failure recovery procedure to assist RLF procedure if different RS is used.

That is, there might be aperiodic indication from L1 which indicate either success or failure of beam failure recovery procedure. How to use such aperiodic indication in RLM/RLF procedure need be settled. The beam failure and recovery procedure could be summarized as follows: UE monitors configured DL beam(s)/beam pair(s) and based on that UE can detect beam failure; upon detecting the failure the UE can select new DL beam(s)/pairs (which can either be from the same cell or from a different cell, if configured); upon selecting new beam(s) UE triggers a beam recovery attempt by notifying the network (UL message); UE monitors a network response to finally declare a successful recovery.

Thus, it may be useful to provide aperiodic indication(s) based on beam failure recovery procedure to assist radio link failure (RLF) procedure, if same RS is used for beam failure recovery and RLM procedures. It needs to be decided whether such aperiodic indicator can influence RLM/RLF or not, and if so, how. If it is assumed that a successful beam recovery (possibly indicated by the reception of the network message on the selected beam) will lead to the generation of IS events, and, once the UE starts to measure the RS used for RLM after a successful recovery, the number of IS events will likely increase and at some point, the RLF timer should be stopped due to that. However, if T310 is close to expire when beam recovery is successful, despite the fact that it is a matter of time to detect the recovery of the link, the UE may declare RLF. For that reason, it can be argued that the detection of a successful recovery should immediately stop the RLF timer. However, although a successful beam recovery indicates that the link is very likely to be recovered, periodic IS events are probably a safer mechanism where the higher layers can make sure the link has not only been recovered but is also stable over time. Thus, the possibility to configure the UE to not only stop the RLF timer upon the occurrence of a successful beam recovery but also based on aperiodic IS indication generated due to beam recovery plus a number of configurable periodic IS events (which can be smaller value than the counter equivalent to N311 in LTE) should be considered.

At some extreme case, there maybe not enough periodic IS event to stop RLF timer even beam failure recovery is successful. Thus, it is proposed that successful beam recovery can be used together with periodic IS to stop RLF timer.

Regarding the failure of beam failure recovery, assuming that this only means from lower layer perspective, no further beam failure recovery procedure will continue. Therefore whether UE can recovery its link after sending indication of failure of beam failure recovery is not clear. If it is assumed that this depends on the number of beam failure recovery procedure attempts or duration of this this beam failure recovery procedure. If the number of attempts is small, or the duration of this beam failure recovery procedure is short, quite probably UE can still recover its link even it does not continue beam failure recovery procedure. For example, UE is blocked by an obstacle, and later this obstacle is removed. Therefore, it is not reasonable to declare RLF immediately when receiving indication that beam recovery is failed in some case. On the other hand, it may be also not reasonable not considering such indicator in some other case. Whether UE can recover its link after receiving indication of failure of beam failure recovery is scenario dependent. It is proposed that failure of beam recovery can be used together with periodic OOS to either start T310 (if it hasn't been started), or declare RLF.

Besides, indication of success or failure of beam recovery, the attempt to recovery beam failure can be also be considered for RLM-RLF procedure. A possible scenario is that the UE detects a beam failure and starts the preparation for beam recovery, e.g., by selecting a new beam before sending an associated UL recovery request. During that process, the RLF timer may be running so that while the UE is still trying to recover, an RLF could potentially be declared, despite the high potential of a successful procedure e.g. if the UE has selected a new beam that is strong enough and stable. If as proposed for the successful case the UE also stops the RLF timer even at the recovery attempt, and the attempt is not successful, it will take a longer time until the RLF timer starts again (i.e. based on OOS events) and the UE would be unnecessarily unreachable for much longer. Hence, to avoid the early stop of the RLF timer, a possibility could be to put it on hold during the recovery attempt. If beam failure recovery is successful, proposal 1 can be applied, if, if not successful, proposal 2 can be applied. It is proposed that beam recovery attempt can be used to put the RLF timer on hold.

In LTE, the RLF modelling has two phases. The first phase occurs before the RLF timer is triggered in LTE and the second phase starts after. Among the open issues is the existence of a second phase, after the RLF timer expires. In LTE, a second timer is triggered and UE-based mobility/cell reselection is allowed, before Re-establishment is triggered.

It is proposed that when the RLF timer expires, the "Second phase" timer starts and the UE is allowed to perform UE-based mobility (i.e. cell reselection).

In LTE, when the RLF timer expires, RRC connection re-establishment procedure is triggered, where the UE first performs cell reselection. If the new selected cell is still an LTE cell, UE initiates random access procedure on that cell, and then sends RRCConnectionReestablishmentRequest message towards the network. If the new selected cell is an inter-RAT cell, then UE should perform the actions upon leaving RRC_CONNECTED.

In NR, an additional aspect related to the second phase that should be further discussed concerns the case where the UE re-selects to a cell from which it has been previously configured to perform beam recovery. In other words, the network can configure the UE to upon beam failure to either select a beam from the PCell or to select a beam from another cell. After RLF is declared, re-selects to one of these configured cells, there is no reason not to perform beam recovery to one of these cells instead of the usual RRC Connection Reconfiguration.

An additional aspect to consider in NR is the possibility that the upon RLF the UE re-selects to an LTE cell. If the new selected cell is an LTE cell which connects to Next Generation Core, we think it is not necessary for UE to leave RRC_CONNECTED state and do cell selection from scratch. UE should continue with RRC re-establishment procedure as well instead of leaving RRC_CONNECTED even though this new selected cell is an inter-RAT cell. This is reasonable as UE can build up its context in LTE cell from old NR cell as the two cells are using same core network. If the new selected cell is a LTE cell which connects to legacy EPC or other inter-RAT cell, then UE should perform actions upon leaving RRC_CONNECTED. It is proposed that when UE encounter RLF in NR and reselect to an NR cell or an LTE cell which connects to 5GC, RRC connection re-establishment procedure is applied. Otherwise, UE perform actions upon leaving RRC_CONNECTED.

Figure 7:
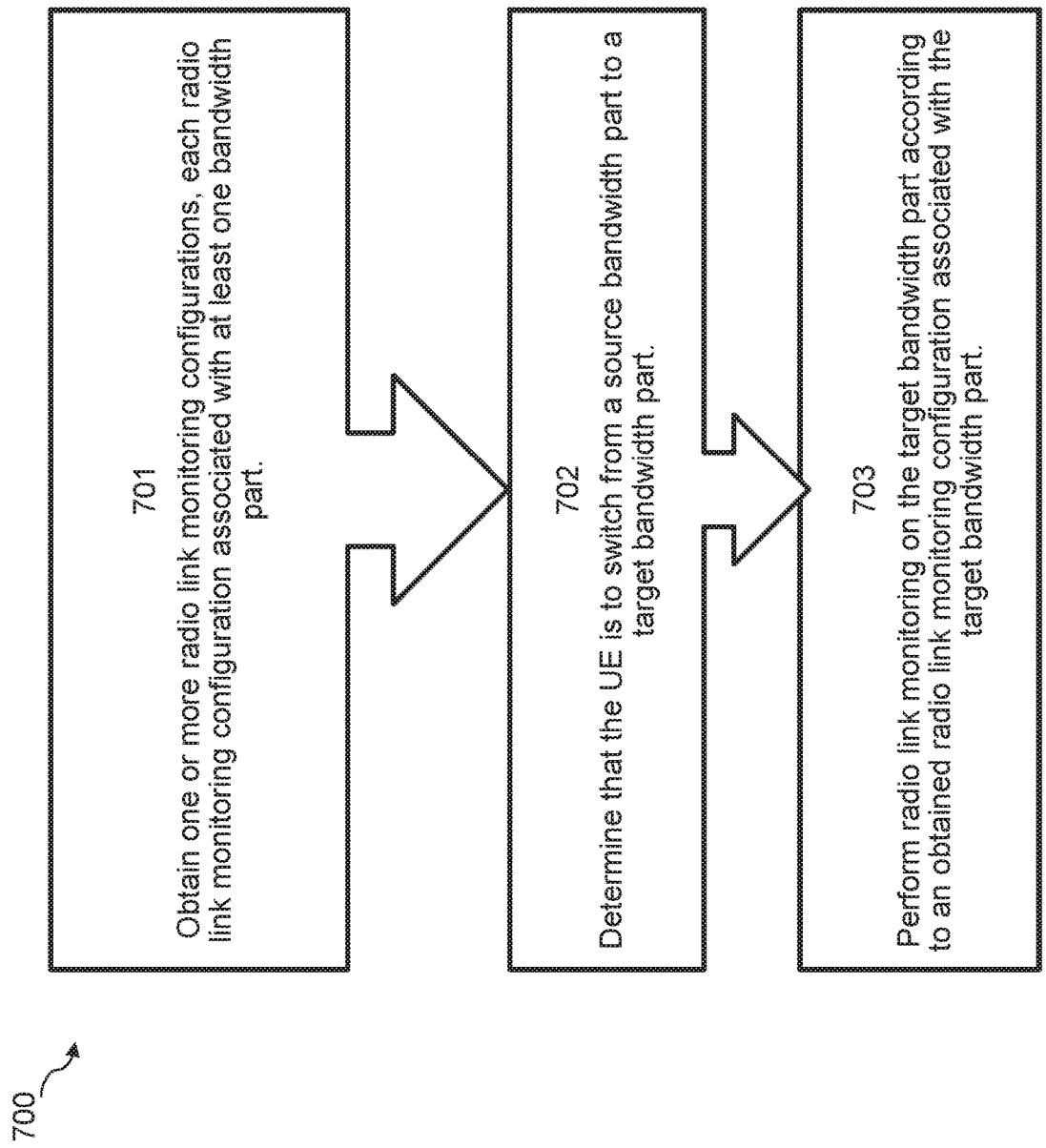
FIG. 7 is a flowchart of a method in a UE, in accordance with certain embodiments.

FIG. 7 is a flowchart of a method 700 in a UE, in accordance with certain embodiments. Method 700 begins at step 701, wherein the UE obtains one or more radio link monitoring configurations, each radio link monitoring configuration associated with at least one bandwidth part.

In certain embodiments, obtaining the one or more radio link monitoring configurations may comprise receiving the one or more radio link monitoring configurations in a message from a network node. In certain embodiments, obtaining the one or more radio link monitoring configurations may comprise determining the one or more radio link monitoring configurations according to one or more predefined rules.

In certain embodiments, each radio link monitoring configuration may comprise: a set of radio resources for performing radio link monitoring within its associated bandwidth part; and one or more configuration parameters for performing radio link monitoring within its associated bandwidth part.

In certain embodiments, the set of radio resources may comprise a CSI-RS resource. In certain embodiments, the set of radio resources may comprise a SSB.

In certain embodiments, the one or more configuration parameters for performing radio link monitoring within its associated bandwidth part may comprise one or more of: one or more filtering parameters; one or more radio link failure timers; an evaluation period; a number of retransmissions before radio link failure is declared; a hypothetical channel configuration: a hypothetical signal configuration; and a mapping function for a measured link quality and a hypothetical channel block error rate. In certain embodiments, the one or more configuration parameters for performing radio link monitoring within its associated bandwidth part may comprise one or more filtering parameters and the one or more filtering parameters may comprise one or more of N310, N311, and N313, N314 counters. In certain embodiments, the one or more configuration parameters for performing radio link monitoring within its associated bandwidth part may comprise one or more radio link failure timers and the one or more radio link failure timers may comprise one or more of T310, T311, T313, and T314 timers.

In certain embodiments, at least one of the obtained one or more radio link monitoring configurations may comprise a default radio link monitoring configuration. In certain embodiments, the default radio link monitoring configuration may be associated with a default bandwidth part.

At step 702, the UE determines that the UE is to switch from a source bandwidth part to a target bandwidth part.

At step 703, the UE performs radio link monitoring on the target bandwidth part according to an obtained radio link monitoring configuration associated with the target bandwidth part.

In certain embodiments, the method may comprise performing monitoring of a downlink channel quality of a first bandwidth part and a second bandwidth part. In certain embodiments, the performing monitoring may comprise: estimating, during a first period of time, a radio link quality of the first bandwidth part according to a radio link monitoring configuration associated with the first bandwidth part; and estimating, during a second period of time, a radio link quality of the second bandwidth part according to a radio link monitoring configuration associated with the second bandwidth part, wherein the second period of time at least partially overlaps with the first period of time. In certain embodiments, the first bandwidth part may comprise the source bandwidth part and the second bandwidth part may comprise the target bandwidth part. In certain embodiments, the monitoring may be triggered based on an activation rate of one or more of the first bandwidth part and the second bandwidth part.

In certain embodiments, the radio link monitoring configuration associated with the target bandwidth part may comprise a plurality of sets of radio resources, and the method may further comprise selecting one or more of the plurality of sets of radio resources to use to perform radio link monitoring on the target bandwidth part based on a pre-defined rule.

In certain embodiments, a plurality of radio link monitoring configurations may be associated with the target bandwidth part, and the method may further comprise receiving an instruction via downlink control information to use one of the plurality of radio link monitoring configurations to perform radio link monitoring on the target bandwidth part.

In certain embodiments, a radio link monitoring configuration associated with the source bandwidth part and the radio link monitoring configuration associated with the target bandwidth part may use the same radio resources, and performing radio link monitoring on the target bandwidth part according to the obtained radio link monitoring configuration associated with the target bandwidth part may comprise using one or more of previously-performed measurements and previously-performed measurement samples to generate out-of-sync and in-sync events.

In certain embodiments, a radio link monitoring configuration associated with the source bandwidth part and the radio link monitoring configuration associated with the target bandwidth part may use different radio resources. In certain embodiments, performing radio link monitoring on the target bandwidth part according to the obtained radio link monitoring configuration associated with the target bandwidth part may comprise applying a relation function to one or more of previously-performed measurements and previously-performed measurement samples to generate out-of-sync and in-sync events without resetting a radio link failure timer or a radio link failure counter. In certain embodiments, performing radio link monitoring on the target bandwidth part according to the obtained radio link monitoring configuration associated with the target bandwidth part may comprise resetting at least one of a radio link failure timer and a radio link failure counter. In certain embodiments, resetting at least one of a radio link failure timer and a radio link failure counter may comprise resetting a set of radio link failure timers and radio link failure counters associated with radio link monitoring for out-of-synch events and allowing a set of radio link failure timers and radio link failure counters associated with radio link monitoring for in-synch events to continue. In certain embodiments, resetting at least one of a radio link failure timer and a radio link failure counter may comprise resetting one or more radio link failure timers without resetting any radio link failure counters.

Figure 8:
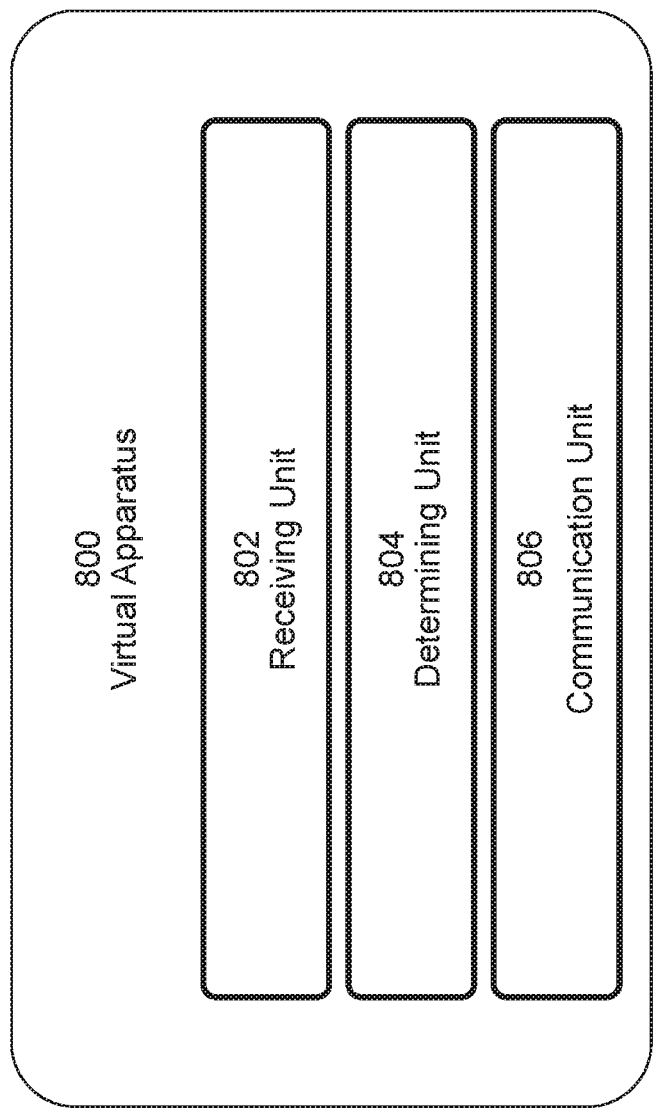
FIG. 8 is a schematic block diagram of a virtualization apparatus, in accordance with certain embodiments.

FIG. 8 is a schematic block diagram of a virtualization apparatus, in accordance with certain embodiments. More particularly, FIG. 8 illustrates a schematic block diagram of an apparatus 800 in a wireless network (for example, the wireless network shown in FIG. 6). The apparatus may be implemented in a wireless device (e.g., wireless device 110 shown in FIG. 6. Apparatus 800 is operable to carry out the example method described with reference to FIG. 7 and possibly any other processes or methods disclosed herein. It is also to be understood that the method of FIG. 7 is not necessarily carried out solely by apparatus 800. At least some operations of the method can be performed by one or more other entities.

Virtual Apparatus 800 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 802, determining unit 804, communication unit 806, and any other suitable units of apparatus 800 to perform corresponding functions according one or more embodiments of the present disclosure.

In certain embodiments, apparatus 800 may be a UE. As illustrated in FIG. 8, apparatus 800 includes receiving unit 802, determining unit 804, and communication unit 806. Receiving unit 802 may be configured to perform the receiving functions of apparatus 800. For example, receiving unit 802 may be configured to obtain one or more radio link monitoring configurations, each radio link monitoring configuration associated with at least one bandwidth part. In certain embodiments, receiving unit 802 may be configured to receive the one or more radio link monitoring configurations in a message from a network node.

As another example, in certain embodiments a plurality of radio link monitoring configurations may be associated with the target bandwidth part, and receiving unit 802 may be configured to receive an instruction via downlink control information to use one of the plurality of radio link monitoring configurations to perform radio link monitoring on the target bandwidth part.

Receiving unit 802 may receive any suitable information (e.g., from a wireless device or another network node). Receiving unit 802 may include a receiver and/or a transceiver, such as RF transceiver circuitry 122 described above in relation to FIG. 6. Receiving unit 802 may include circuitry configured to receive messages and/or signals (wireless or wired). In particular embodiments, receiving unit 802 may communicate received messages and/or signals to determining unit 804 and/or any other suitable unit of apparatus 800. The functions of receiving unit 802 may, in certain embodiments, be performed in one or more distinct units.

Determining unit 804 may perform the processing functions of apparatus 800. For example, determining unit 804 may be configured to obtain one or more radio link monitoring configurations, each radio link monitoring configuration associated with at least one bandwidth part. In certain embodiments, determining unit 804 may be configured to determine the one or more radio link monitoring configurations according to one or more pre-defined rules. As another example, determining unit 804 may be configured to determine that the UE is to switch from a source bandwidth part to a target bandwidth part.

As still another example, determining unit 804 may be configured to perform radio link monitoring on the target bandwidth part according to an obtained radio link monitoring configuration associated with the target bandwidth part. In certain embodiments, determining unit 804 may be configured to perform monitoring of a downlink channel quality of a first bandwidth part and a second bandwidth part. In certain embodiments, determining unit 804 may be configured to estimate, during a first period of time, a radio link quality of the first bandwidth part according to a radio link monitoring configuration associated with the first bandwidth part; and estimate, during a second period of time, a radio link quality of the second bandwidth part according to a radio link monitoring configuration associated with the second bandwidth part, wherein the second period of time at least partially overlaps with the first period of time.

As yet another example, in certain embodiments the radio link monitoring configuration associated with the target bandwidth part may comprise a plurality of sets of radio resources, and determining unit 804 may be configured to select one or more of the plurality of sets of radio resources to use to perform radio link monitoring on the target bandwidth part based on a pre-defined rule.

As another example, in certain embodiments a radio link monitoring configuration associated with the source bandwidth part and the radio link monitoring configuration associated with the target bandwidth part may use the same radio resources, and determining unit 804 may be configured to use one or more of previously-performed measurements and previously-performed measurement samples to generate out-of-sync and in-sync events.

As another example, in certain embodiments a radio link monitoring configuration associated with the source bandwidth part and the radio link monitoring configuration associated with the target bandwidth part may use different radio resources, and to perform radio link monitoring on the target bandwidth part according to the obtained radio link monitoring configuration associated with the target bandwidth part, determining unit 804 may be configured to apply a relation function to one or more of previously-performed measurements and previously-performed measurement samples to generate out-of-sync and in-sync events without resetting a radio link failure timer or a radio link failure counter. In certain embodiments, determining unit 804 may be configured to reset at least one of a radio link failure timer and a radio link failure counter. In certain embodiments, determining unit 804 may be configured to reset a set of radio link failure timers and radio link failure counters associated with radio link monitoring for out-of-synch events and allow a set of radio link failure timers and radio link failure counters associated with radio link monitoring for in-synch events to continue. In certain embodiments, determining unit 804 may be configured to reset one or more radio link failure timers without resetting any radio link failure counters.

Determining unit 804 may include or be included in one or more processors, such as processing circuitry 120 described above in relation to FIG. 6. Determining unit 804 may include analog and/or digital circuitry configured to perform any of the functions of determining unit 804 and/or processing circuitry 120 described above. The functions of determining unit 804 may, in certain embodiments, be performed in one or more distinct units.

Communication unit 806 may be configured to perform the transmission functions of apparatus 800. Communication unit 806 may transmit messages (e.g., to a wireless device and/or another network node). Communication unit 806 may include a transmitter and/or a transceiver, such as RF transceiver circuitry 122 described above in relation to FIG. 6. Communication unit 806 may include circuitry configured to transmit messages and/or signals (e.g., through wireless or wired means). In particular embodiments, communication unit 806 may receive messages and/or signals for transmission from determining unit 804 or any other unit of apparatus 800. The functions of communication unit 804 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks procedures, computations, outputs, and/or displaying functions, and so on, as such as those that are described herein.

Figure 9:
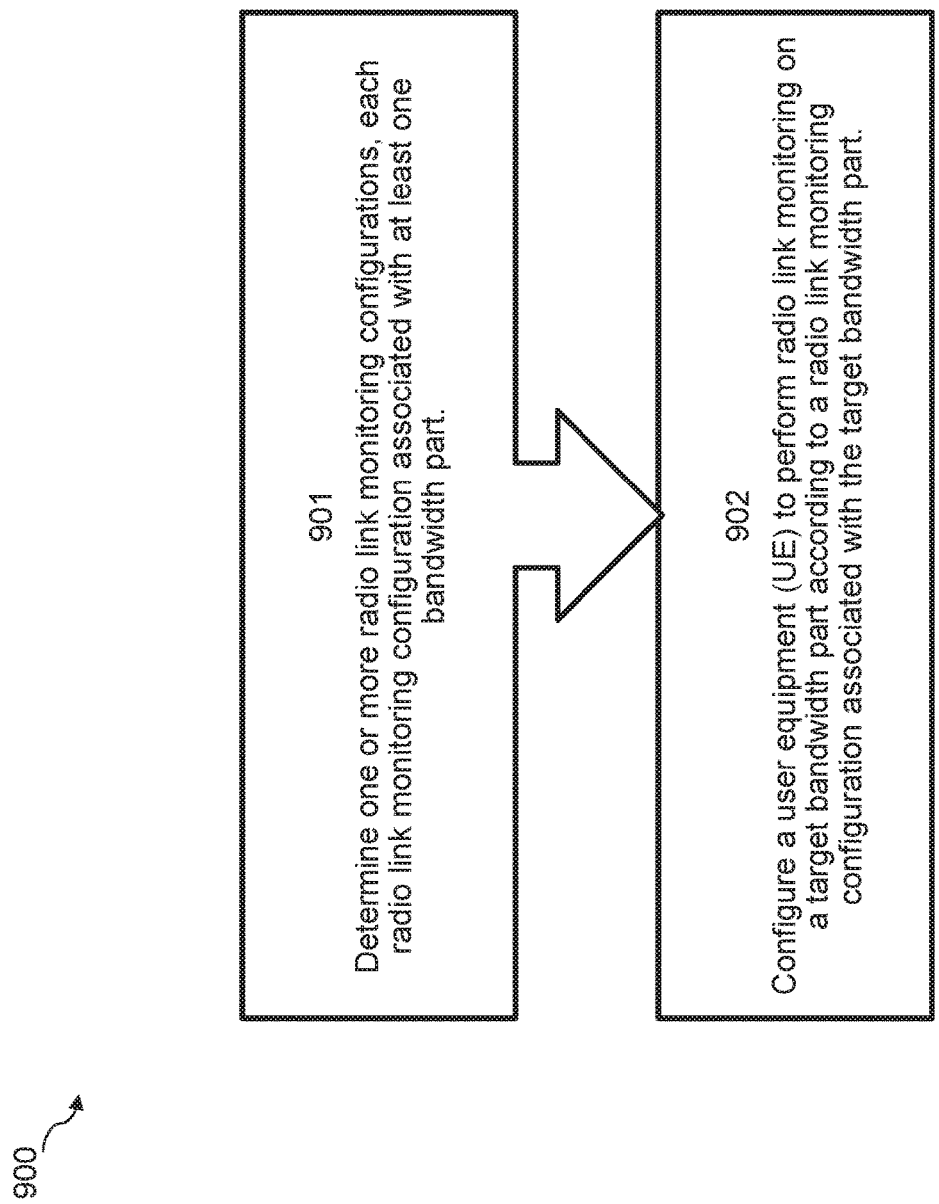
FIG. 9 is a flowchart of a method in a network node, in accordance with certain embodiments.

FIG. 9 is a flowchart of a method 900 in a network node, in accordance with certain embodiments. Method 900 begins at step 901, where the network node determines one or more radio link monitoring configurations, each radio link monitoring configuration associated with at least one bandwidth part.

In certain embodiments, each radio link monitoring configuration may comprise a set of radio resources for performing radio link monitoring within its associated bandwidth part and one or more configuration parameters for performing radio link monitoring within its associated bandwidth part. In certain embodiments, the set of radio resources may comprise a CSI-RS resource. In certain embodiments, the set of radio resources may comprise a SSB.

In certain embodiments, the one or more configuration parameters for performing radio link monitoring within its associated bandwidth part comprise one or more of: one or more filtering parameters; one or more radio link failure timers: an evaluation period; a number of retransmissions before radio link failure is declared; a hypothetical channel configuration: a hypothetical signal configuration; and a mapping function for a measured link quality and a hypothetical channel block error rate. In certain embodiments, the one or more configuration parameters for performing radio link monitoring within its associated bandwidth part may comprise one or more filtering parameters and the one or more filtering parameters may comprise one or more of N310, N311, and N313, N314 counters. In certain embodiments, the one or more configuration parameters for performing radio link monitoring within its associated bandwidth part may comprise one or more radio link failure timers and the one or more radio link failure timers may comprise one or more of T310, T311, T313, and T314 timers.

In certain embodiments, at least one of the determined one or more radio link monitoring configurations may comprise a default radio link monitoring configuration. In certain embodiments, the default radio link monitoring configuration may be associated with a default bandwidth part.

At step 902, the network node configures a UE to perform radio link monitoring on a target bandwidth part according to a radio link monitoring configuration associated with the target bandwidth part.

In certain embodiments, configuring the UE to perform radio link monitoring on the target bandwidth part according to the radio link monitoring configuration associated with the target bandwidth part may comprise sending an indication of the radio link monitoring configuration associated with the target bandwidth part to the UE. In certain embodiments, sending the indication of the radio link monitoring configuration associated with the target bandwidth part to the UE may comprise sending an indication of the radio link monitoring configuration associated with the target bandwidth part in an information element within a bandwidth part configuration for the target bandwidth part. In certain embodiments, sending the indication of the radio link monitoring configuration associated with the target bandwidth part to the UE may comprise sending an indication of the radio link monitoring configuration associated with the target bandwidth part in an information element within a serving cell configuration. In certain embodiments, the indication may comprise a radio link monitoring configuration identifier.

In certain embodiments, configuring the UE to perform radio link monitoring on the target bandwidth part according to the radio link monitoring configuration associated with the target bandwidth part may comprise configuring the UE to determine the radio link monitoring configuration associated with the target bandwidth part according to one or more predefined rules.

In certain embodiments, the radio link monitoring configuration associated with the target bandwidth part may comprise a plurality of sets of radio resources, and the method may further comprise configuring the UE to select one or more of the plurality of sets of radio resources to use to perform radio link monitoring on the target bandwidth part based on a pre-defined rule.

In certain embodiments, a plurality of radio link monitoring configurations may be associated with the target bandwidth part, and the method may further comprise sending an instruction to the UE to use one of the plurality of radio link monitoring configurations to perform radio link monitoring on the target bandwidth part.

In certain embodiments, a radio link monitoring configuration associated with a source bandwidth part and the radio link monitoring configuration associated with the target bandwidth part may use the same radio resources, and configuring the UE to perform radio link monitoring on the target bandwidth part according to the radio link monitoring configuration associated with the target bandwidth part may comprise configuring the UE to use one or more of previously-performed measurements and previously-performed measurement samples to generate out-of-sync and in-sync events.

In certain embodiments, a radio link monitoring configuration associated with a source bandwidth part and the radio link monitoring configuration associated with the target bandwidth part may use different radio resources. In certain embodiments, configuring the UE to perform radio link monitoring on the target bandwidth part according to the radio link monitoring configuration associated with the target bandwidth part may comprise configuring the UE to apply a relation function to one or more previously-performed measurements and previously-performed measurement samples to generate out-of-sync and in-sync events without resetting a radio link failure timer or a radio link failure counter. In certain embodiments, configuring the UE to perform radio link monitoring on the target bandwidth part according to the radio link monitoring configuration associated with the target bandwidth part may comprise configuring the UE to reset at least one of a radio link failure timer and a radio link failure counter. In certain embodiments, configuring the UE to reset at least one of a radio link failure timer and a radio link failure counter may comprise configuring the UE to reset a set of radio link failure timers and radio link failure counters associated with radio link monitoring for out-of-synch events and configuring the UE to allow a set of radio link failure timers and radio link failure counters associated with radio link monitoring for in-synch measurements to continue. In certain embodiments, configuring the UE to reset at least one of a radio link failure timer and a radio link failure counter may comprise configuring the UE to reset one or more radio link failure timers without resetting any radio link failure counters.

Figure 10:
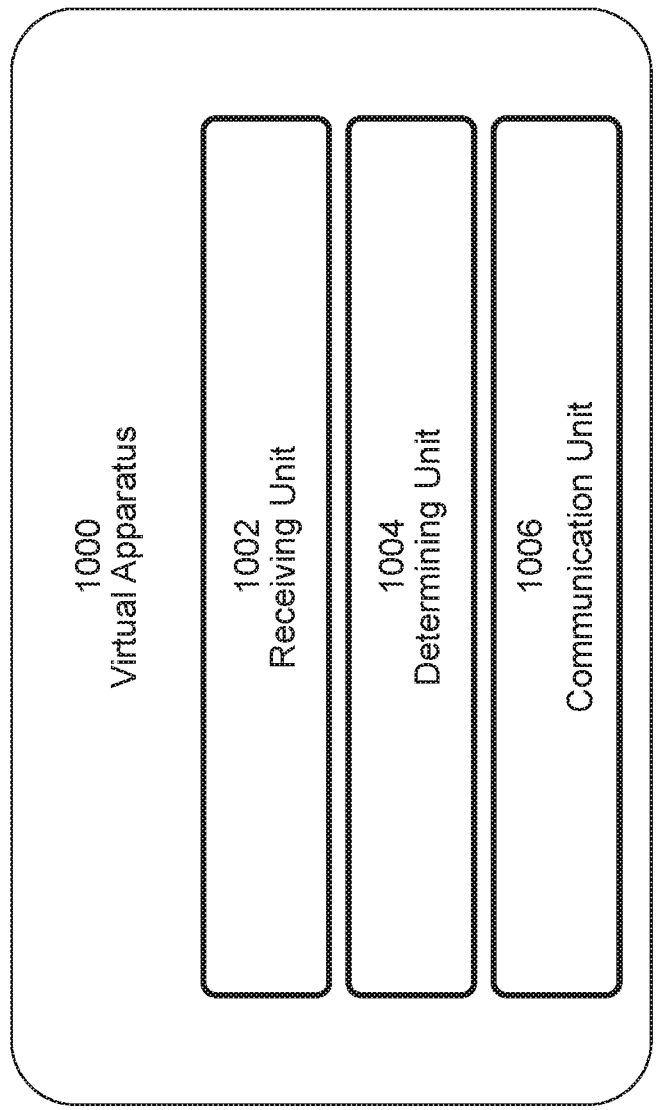
FIG. 10 is a schematic block diagram of a virtualization apparatus, in accordance with certain embodiments.

FIG. 10 is a schematic block diagram of a virtualization apparatus, in accordance with certain embodiments. More particularly, FIG. 10 illustrates a schematic block diagram of an apparatus 1000 in a wireless network (for example, the wireless network shown in FIG. 6). The apparatus may be implemented in a network node (e.g., network node 160 shown in FIG. 6). Apparatus 1000 is operable to carry out the example method described with reference to FIG. 9 and possibly any other processes or methods disclosed herein. It is also to be understood that the method of FIG. 9 is not necessarily carried out solely by apparatus 1000. At least some operations of the method can be performed by one or more other entities.

Virtual Apparatus 1000 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1002, determining unit 1004, communication unit 1006, and any other suitable units of apparatus 1000 to perform corresponding functions according one or more embodiments of the present disclosure.

In certain embodiments, apparatus 1000 may be an eNB or a gNB. As illustrated in FIG. 10, apparatus 1000 includes receiving unit 1002, determining unit 1004, and communication unit 1006. Receiving unit 1002 may be configured to perform the receiving functions of apparatus 1000. Receiving unit 1002 may receive any suitable information (e.g., from a wireless device or another network node). Receiving unit 1002 may include a receiver and/or a transceiver, such as RF transceiver circuitry 172 described above in relation to FIG. 6. Receiving unit 1002 may include circuitry configured to receive messages and/or signals (wireless or wired). In particular embodiments, receiving unit 1002 may communicate received messages and/or signals to determining unit 1004 and/or any other suitable unit of apparatus 1000. The functions of receiving unit 1002 may, in certain embodiments, be performed in one or more distinct units.

Determining unit 1004 may perform the processing functions of apparatus 1000. For example, determining unit 1004 may be configured to determine one or more radio link monitoring configurations, each radio link monitoring configuration associated with at least one bandwidth part. As another example, determining unit 1004 may be configured to configure a UE to perform radio link monitoring on a target bandwidth part according to a radio link monitoring configuration associated with the target bandwidth part. In certain embodiments, determining unit 1004 may be configured to configure the UE to determine the radio link monitoring configuration associated with the target bandwidth part according to one or more predefined rules. In certain embodiments, the radio link monitoring configuration associated with the target bandwidth part may comprise a plurality of sets of radio resources, and determining unit 1004 may be configured to configure the UE to select one or more of the plurality of sets of radio resources to use to perform radio link monitoring on the target bandwidth part based on a pre-defined rule. In certain embodiments, a radio link monitoring configuration associated with a source bandwidth part and the radio link monitoring configuration associated with the target bandwidth part may use the same radio resources, and determining unit 1004 may be configured to configure the UE to use one or more of previously-performed measurements and previously-performed measurement samples to generate out-of-sync and in-sync events. In certain embodiments, a radio link monitoring configuration associated with a source bandwidth part and the radio link monitoring configuration associated with the target bandwidth part may use different radio resources, and determining unit 1004 may be configured to configure the UE to apply a relation function to one or more previously-performed measurements and previously-performed measurement samples to generate out-of-sync and in-sync events without resetting a radio link failure timer or a radio link failure counter. In certain embodiments, determining unit 1004 may be configured to configure the UE to reset at least one of a radio link failure timer and a radio link failure counter. In certain embodiments, determining unit 1004 may be configured to configure the UE to reset a set of radio link failure timers and radio link failure counters associated with radio link monitoring for out-of-synch events and configure the UE to allow a set of radio link failure timers and radio link failure counters associated with radio link monitoring for in-synch measurements to continue. In certain embodiments, determining unit 1004 may be configured to configure the UE to reset one or more radio link failure timers without resetting any radio link failure counters.

Determining unit 1004 may include or be included in one or more processors, such as processing circuitry 170 described above in relation to FIG. 6. Determining unit 1004 may include analog and/or digital circuitry configured to perform any of the functions of determining unit 1004 and/or processing circuitry 170 described above. The functions of determining unit 1004 may, in certain embodiments, be performed in one or more distinct units.

Communication unit 1006 may be configured to perform the transmission functions of apparatus 1000. For example, in certain embodiments a plurality of radio link monitoring configurations may be associated with the target bandwidth part, and communication unit 1006 may be configured to send an instruction to the UE to use one of the plurality of radio link monitoring configurations to perform radio link monitoring on the target bandwidth part. As another example, communication unit 1006 may be configured to send an indication of the radio link monitoring configuration associated with the target bandwidth part to the UE. In certain embodiments, communication unit 1006 may be configured to send an indication of the radio link monitoring configuration associated with the target bandwidth part in an information element within a bandwidth part configuration for the target bandwidth part. In certain embodiments, communication unit 1006 may be configured to send an indication of the radio link monitoring configuration associated with the target bandwidth part in an information element within a serving cell configuration.

Communication unit 1006 may transmit messages (e.g., to a wireless device and/or another network node). Communication unit 1006 may include a transmitter and/or a transceiver, such as RF transceiver circuitry 172 described above in relation to FIG. 6 Communication unit 1006 may include circuitry configured to transmit messages and/or signals (e.g., through wireless or wired means). In particular embodiments, communication unit 1006 may receive messages and/or signals for transmission from determining unit 1004 or any other unit of apparatus 1000. The functions of communication unit 1004 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 11:
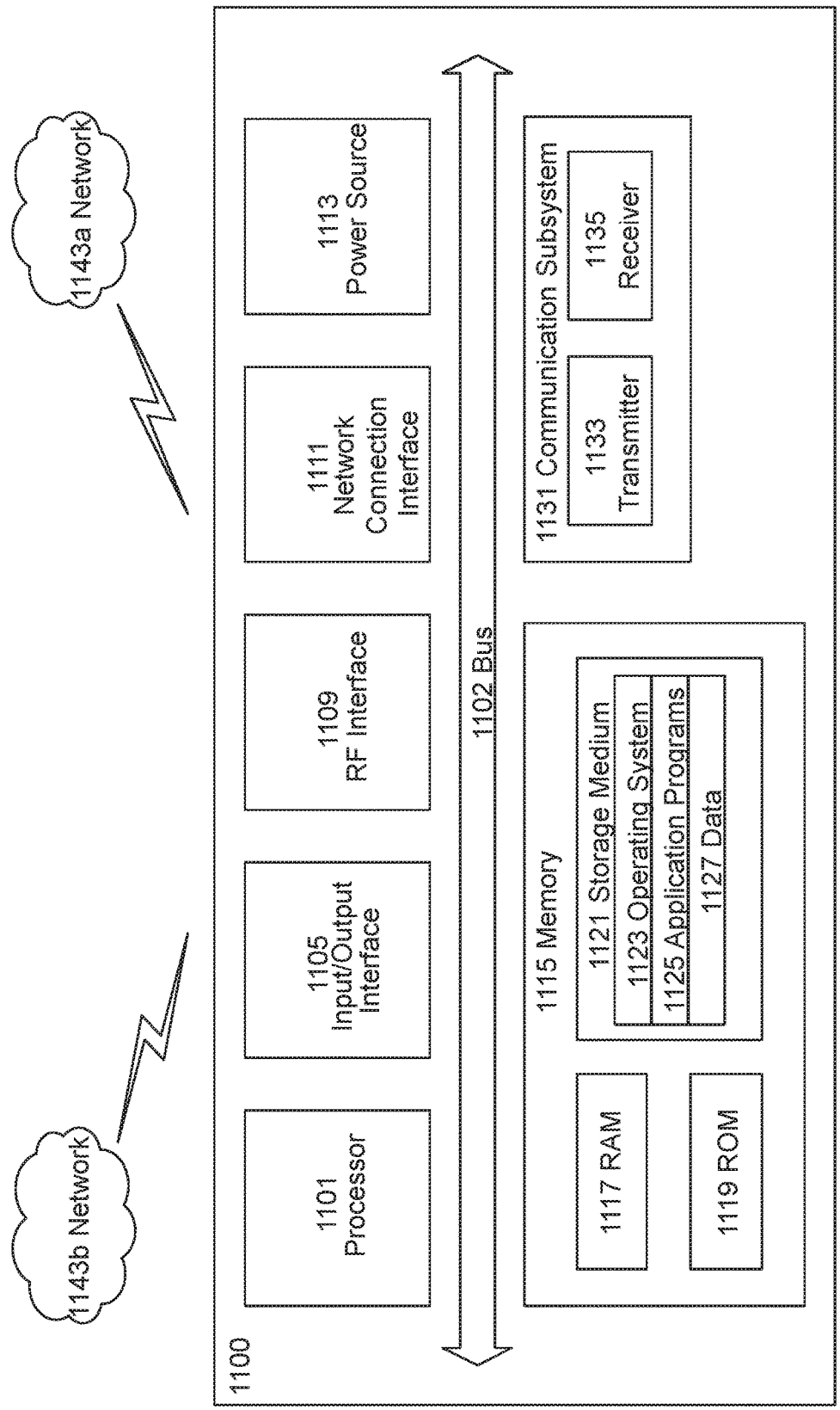
FIG. 11 illustrates one embodiment of a UE, in accordance with certain embodiments.

FIG. 11 illustrates one embodiment of a UE, in accordance with certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the 3rd Generation Partnership Project (3GPP), including a NB-IoT UE that is not intended for sale to, or operation by, a human user. UE 1100, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1113, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143a. Network 1143a may encompass wired and/or wireless networks such as a local-area network (LAN), a wide-area network (WAN), a computer network, a wireless network, a telecommunications network, another like network or any combination thereof. For example, network 1143a may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143*b* may encompass wired and/or wireless networks such as a local-area network (LAN), a wide-area network (WAN), a computer network, a wireless network, a telecommunications network, another like network or any combination thereof. For example, network 1143*b* may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
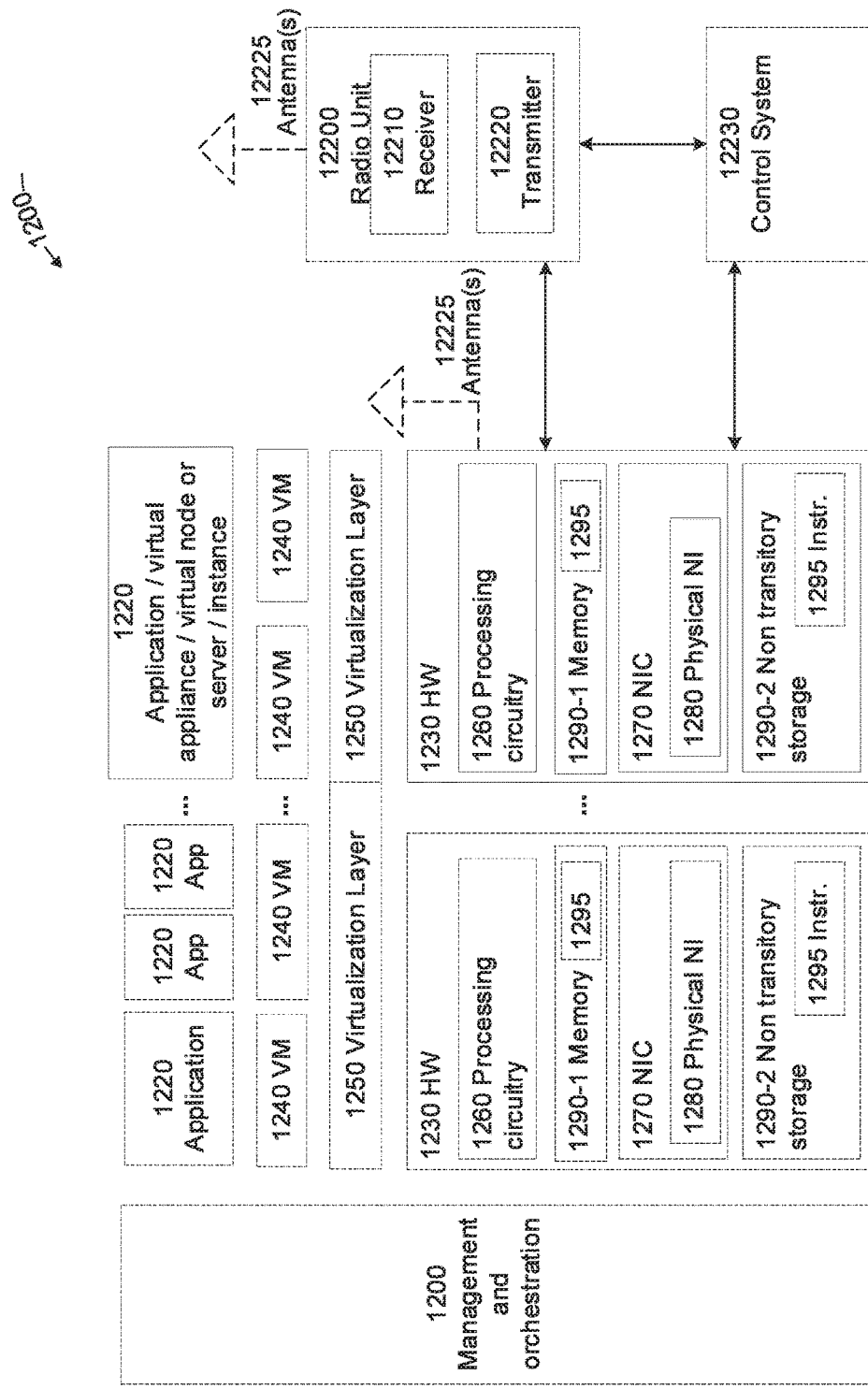
FIG. 12 is a schematic block diagram illustrating a virtualization environment, in accordance with certain embodiments.

FIG. 12 is a schematic block diagram illustrating a virtualization environment, in accordance with certain embodiments. More particularly, FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 13:
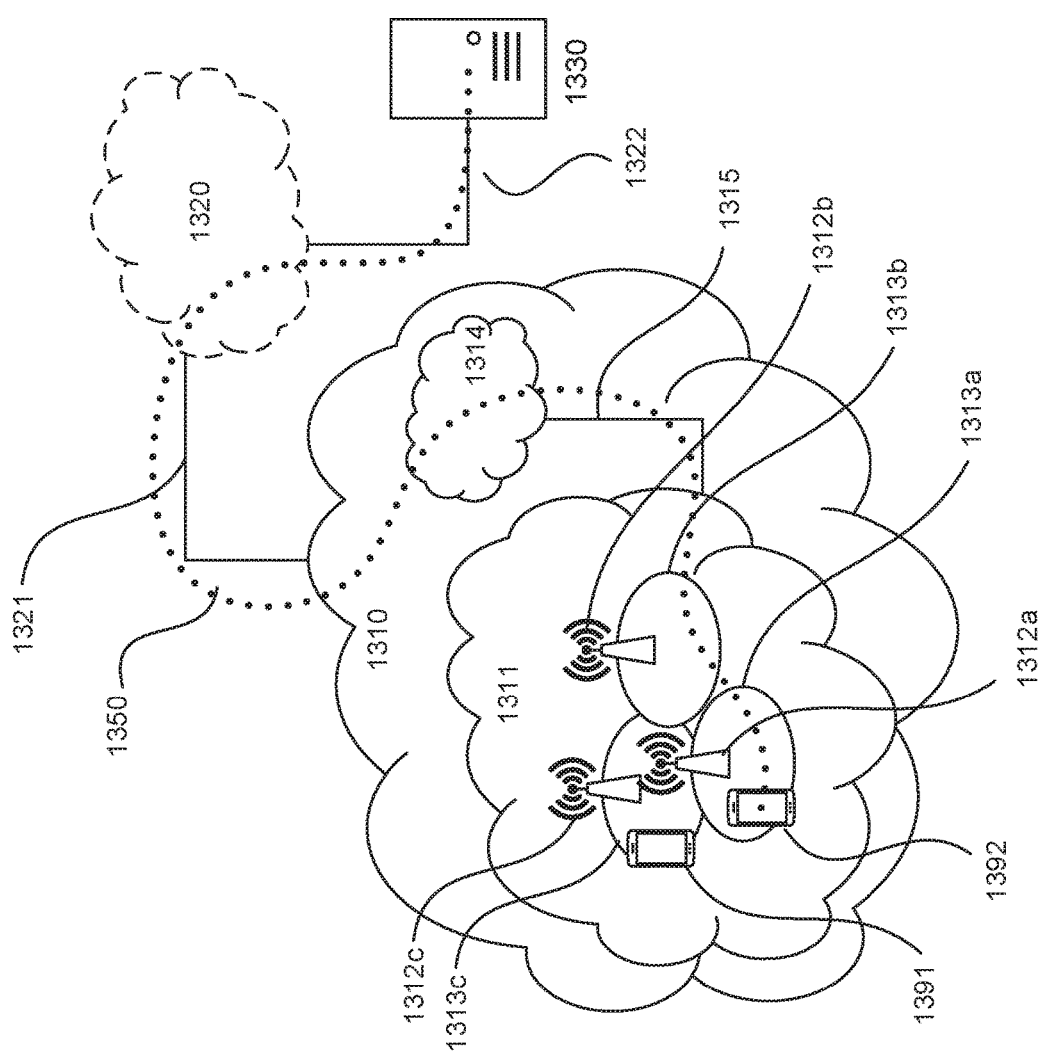
FIG. 13 illustrates an example telecommunication network connected via an intermediate network to a host computer, in accordance with certain embodiments.

FIG. 13 illustrates an example telecommunication network connected via an intermediate network to a host computer, in accordance with certain embodiments. With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b. 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network: intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of UL and DL communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing UL communication originating from the UE 1391 towards the host computer 1330.

Figure 14:
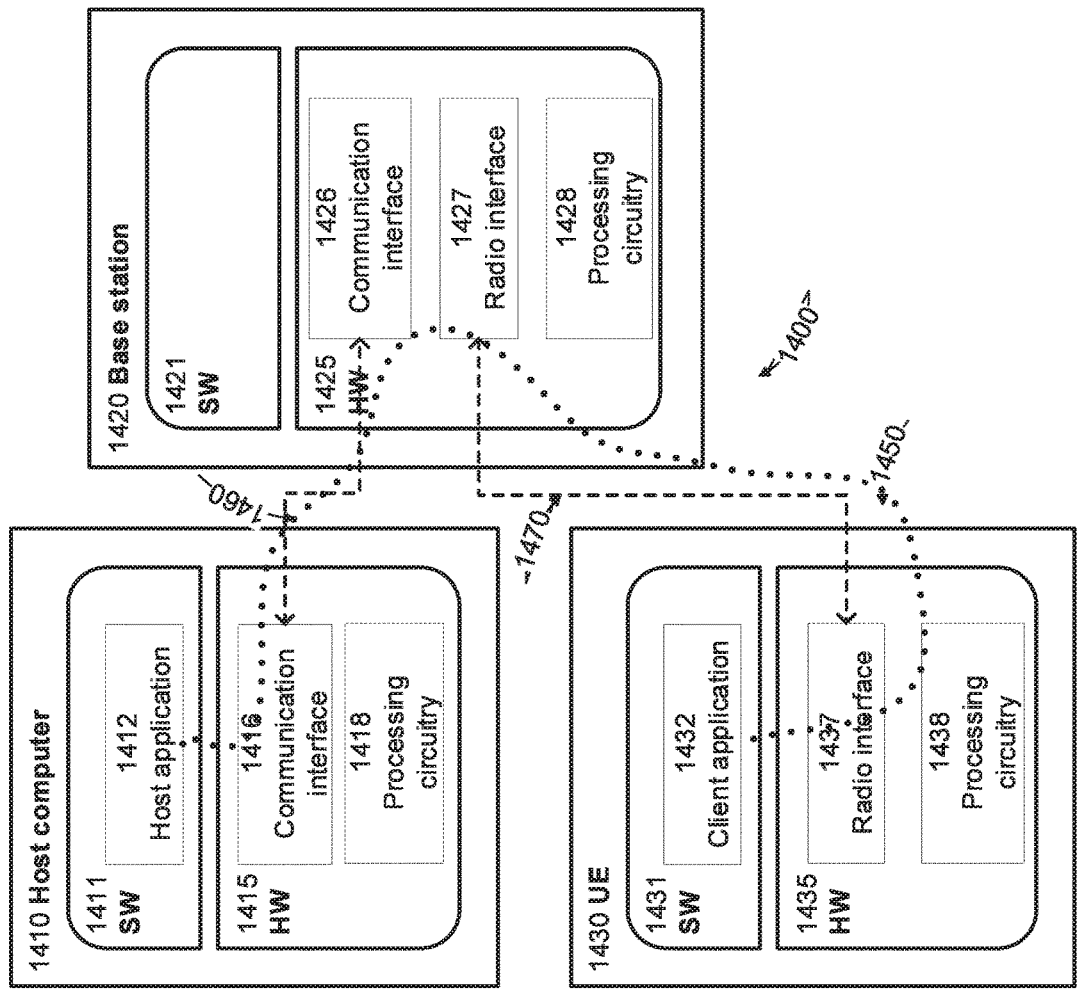
FIG. 14 illustrates an example of a host computer communicating via a base station with a UE over a partially wireless connection, in accordance with certain embodiments.

FIG. 14 illustrates an example of a host computer communicating via a base station with a UE over a partially wireless connection, in accordance with certain embodiments. Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410.

Connection 1460 may be direct, or it may pass through a core network (not explicitly shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 14 may be similar or identical to host computer 1330, one of base stations 1312a, 1312b, 1312c and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the power consumption and thereby provide benefits such as extended battery lifetime and reduced user waiting time.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

FIG. 15 is a flowchart of a method implemented in a communication system, in accordance with certain embodiments. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

FIG. 16 is a flowchart of a method implemented in a communication system, in accordance with certain embodiments. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

FIG. 17 is a flowchart of a method implemented in a communication system, in accordance with certain embodiments. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

FIG. 18 is a flowchart of a method implemented in a communication system, in accordance with certain embodiments. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station. Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

At least some of the following abbreviations may be used in this disclosure. If there is an inconsistency between abbreviations, preference should be given to how it is used above. If listed multiple times below, the first listing should be preferred over any subsequent listing(s).

1xRTT CDMA2000 1x Radio Transmission Technology
3GPP 3rd Generation Partnership Project
5G 5th Generation
ABS Almost Blank Subframe
ARQ Automatic Repeat Request
ASN.1 Abstract Syntax Notation One
AWGN Additive White Gaussian Noise
BCCH Broadcast Control Channel
BCH Broadcast Channel
BLER Block Error Rate
BWP Bandwidth Part
CA Carrier Aggregation
CC Carrier Component
CCCH SDU Common Control Channel SDU
CDMA Code Division Multiplexing Access
CGI Cell Global Identifier
CIR Channel Impulse Response
CORESET Control Resource Set
CP Cyclic Prefix
CPICH Common Pilot Channel
CPICH Ec/No CPICH Received energy per chip divided by the power density in the band
CQI Channel Quality information
C-RNTI Cell RNTI
CRS Cell-specific Reference Signal
CSI Channel State Information
CSI-RS Channel State Information Reference Signal
DCCH Dedicated Control Channel
DCI Downlink Control Information
DL Downlink
DM Demodulation
DMRS Demodulation Reference Signal
DRB Data Radio Bearer
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
E-UTRAN Evolved Universal Terrestrial Radio Access Network
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
IE Information Element
IoT Internet of Things IS In-Sync
L1 Layer 1
L2 Layer 2
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MCG Master Cell Group
MDT Minimization of Drive Tests
MIB Master Information Block
MME Mobility Management Entity
MSC Mobile Switching Center
NB Narrowband
NB-IoT Narrowband Internet of Things
NPDCCH Narrowband Physical Downlink Control Channel
NR New Radio
NW Network
OCNG OFDMA Channel Noise Generator
OFDM Orthogonal Frequency Division Multiplexing
OFDMA Orthogonal Frequency Division Multiple Access
OOS Out-of-Sync
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PCI Physical Cell Identity
PDCCH Physical Downlink Control Channel
PDP Profile Delay Profile
PDSCH Physical Downlink Shared Channel
PGW Packet Gateway
PHICH Physical Hybrid-ARQ Indicator Channel
PHY Physical Layer
PLMN Public Land Mobile Network
PMI Precoder Matrix Indicator
PRACH Physical Random Access Channel
PRB Physical Resource Block
PRS Positioning Reference Signal
PSCell Primary Secondary Cell
PSS Primary Synchronization Signal
PUCCH Physical Uplink Control Channel
PUSCH Physical Uplink Shared Channel
QAM Quadrature Amplitude Modulation
RACH Random Access Channel
RAN Radio Access Network
RAT Radio Access Technology
RE Resource Element
RLC Radio Link Control
RLF Radio Link Failure
RLM Radio Link Monitoring
RNC Radio Network Controller
RNTI Radio Network Temporary Identifier
RRC Radio Resource Control
RRH Remote Radio Head
RRM Radio Resource Management
RRU Remote Radio Unit
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SCG Secondary Cell Group
SDU Service Data Unit
SFN System Frame Number
SGW Serving Gateway
SI System Information
SIB System Information Block
SINR Signal-to-Interference-plus-Noise Ratio
SNR Signal to Noise Ratio
SON Self Optimized Network
SRB Signal Radio Bearer
SS Synchronization Signal
SSB SS Block
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
UP User Plane
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WD Wireless Device
WLAN Wide Local Area Network

The invention claimed is:

1. A method in a user equipment (UE), comprising:
obtaining a first bandwidth part configuration corresponding to a source bandwidth part, wherein the first bandwidth part configuration includes an information element that provides a radio link monitoring configuration associated with the source bandwidth part;
obtaining a second bandwidth part configuration corresponding to a target bandwidth part, wherein the second bandwidth part configuration includes an information element that provides a radio link monitoring configuration associated with the target bandwidth part;
monitoring a downlink channel quality corresponding to the source bandwidth part and the target bandwidth part, the monitoring comprising:
estimating, during a first period of time, a radio link quality corresponding to the source bandwidth part according to the radio link monitoring configuration associated with the source bandwidth part; and
estimating, during a second period of time, a radio link quality corresponding to the target bandwidth part according to a radio link monitoring configuration associated with the target bandwidth part, wherein the second period of time at least partially overlaps with the first period of time; and
determining that the UE is to switch from the source bandwidth part to the target bandwidth part.

2. The method of claim 1, wherein obtaining each radio link monitoring configuration comprises receiving each radio link monitoring configuration in a message from a network node.

3. The method of claim 1, wherein each radio link monitoring configuration comprises:
- a set of radio resources for performing radio link monitoring within its associated bandwidth part, wherein the set of radio resources comprises at least one of a Channel State Information Reference Signal (CSI-RS) resource or a Synchronization Signal Block (SSB); and
- one or more configuration parameters for performing radio link monitoring within its associated bandwidth part.

4. The method of claim 3, wherein the one or more configuration parameters for performing radio link monitoring within its associated bandwidth part comprise one or more of:
- one or more filtering parameters;
- one or more radio link failure timers;
- an evaluation period;
- a number of retransmissions before radio link failure is declared;
- a hypothetical channel configuration;
- a hypothetical signal configuration; or
- a mapping function for a measured link quality and a hypothetical channel block error rate.

5. The method of claim 1, wherein the monitoring is triggered based on an activation rate of one or more of the source bandwidth part and the target bandwidth part.

6. The method of claim 1, wherein a plurality of radio link monitoring configurations are associated with the target bandwidth part, and the method further comprises:
- receiving an instruction via downlink control information to use one of the plurality of radio link monitoring configurations to perform radio link monitoring on the target bandwidth part.

7. The method of claim 1, wherein the radio link monitoring configuration associated with the source bandwidth part and the radio link monitoring configuration associated with the target bandwidth part use the same radio resources.

8. The method of claim 1, wherein the radio link monitoring configuration associated with the source bandwidth part and the radio link monitoring configuration associated with the target bandwidth part use different radio resources.

9. The method of claim 8, wherein performing radio link monitoring on the target bandwidth part according to the radio link monitoring configuration associated with the target bandwidth part comprises:
- applying a relation function to one or more of previously-performed measurements and previously-performed measurement samples to generate out-of-sync and in-sync events without resetting a radio link failure timer or a radio link failure counter.

10. The method of claim 8, wherein the monitoring further comprises:
- resetting at least one of a radio link failure timer and a radio link failure counter.

11. The method of claim 10, wherein resetting at least one of a radio link failure timer and a radio link failure counter comprises:
- resetting a set of radio link failure timers and radio link failure counters associated with radio link monitoring for out-of-synch events; and
- allowing a set of radio link failure timers and radio link failure counters associated with radio link monitoring for in-synch events to continue.

12. The method of claim 10, wherein resetting at least one of a radio link failure timer and a radio link failure counter comprises:
- resetting one or more radio link failure timers without resetting any radio link failure counters.

13. A user equipment (UE), comprising:
- a receiver;
- a transmitter; and
- processing circuitry coupled to the receiver and the transmitter, the processing circuitry configured to perform operations comprising:
  - obtaining a first bandwidth part configuration corresponding to a source bandwidth part, wherein the first bandwidth part configuration includes an information element that provides a radio link monitoring configuration corresponding to the source bandwidth part;
  - obtaining a second bandwidth part configuration corresponding to a target bandwidth part, wherein the second bandwidth part configuration includes an information element that provides a radio link monitoring configuration corresponding to the target bandwidth part;
  - monitoring a downlink channel quality corresponding to the source bandwidth part and the target bandwidth part, the monitoring comprising:
    - estimating, during a first period of time, a radio link quality corresponding to the source bandwidth part according to the radio link monitoring configuration associated with the source bandwidth part; and
    - estimating, during a second period of time, a radio link quality corresponding to the target bandwidth part according to a radio link monitoring configuration associated with the target bandwidth part, wherein the second period of time at least partially overlaps with the first period of time; and
  - determining that the UE is to switch from the source bandwidth part to the target bandwidth part.

14. The UE of claim 13, wherein the operations further comprise obtaining each radio link monitoring configuration in a message from a network node.

15. The UE of claim 13, wherein each radio link monitoring configuration comprises:
- a set of radio resources for performing radio link monitoring within its associated bandwidth part, wherein the set of radio resources comprises at least one of a Channel State Information Reference Signal (CSI-RS) resource or a Synchronization Signal Block (SSB); and
- one or more configuration parameters for performing radio link monitoring within its associated bandwidth part.

16. The UE of claim 15, wherein the one or more configuration parameters for performing radio link monitoring within its associated bandwidth part comprise one or more of:
- one or more filtering parameters;
- one or more radio link failure timers;
- an evaluation period;
- a number of retransmissions before radio link failure is declared;
- a hypothetical channel configuration;
- a hypothetical signal configuration; or
- a mapping function for a measured link quality and a hypothetical channel block error rate.

17. The UE of claim 13, wherein the processing circuitry is further configured to trigger the monitoring based on an activation rate of one or more of the source bandwidth part and the target bandwidth part.

18. The UE of claim 13, wherein a plurality of radio link monitoring configurations are associated with the target bandwidth part, and the processing circuitry is further configured to:
  receive an instruction via downlink control information to use one of the plurality of radio link monitoring configurations to perform radio link monitoring on the target bandwidth part.

19. The UE of claim 13, wherein the radio link monitoring configuration associated with the source bandwidth part and the radio link monitoring configuration associated with the target bandwidth part use the same radio resources.

20. The UE of claim 13, wherein the radio link monitoring configuration associated with the source bandwidth part and the radio link monitoring configuration associated with the target bandwidth part use different radio resources.

21. The UE of claim 20, wherein the processing circuitry is further configured to:
  apply a relation function to one or more of previously-performed measurements and previously-performed measurement samples to generate out-of-sync and in-sync events without resetting a radio link failure timer or a radio link failure counter.

22. The UE of claim 20, wherein the monitoring further comprises:
  resetting at least one of a radio link failure timer and a radio link failure counter.

23. The UE of claim 22, wherein the processing circuitry is further configured to:
  reset a set of radio link failure timers and radio link failure counters associated with radio link monitoring for out-of-synch events; and
  allow a set of radio link failure timers and radio link failure counters associated with radio link monitoring for in-synch events to continue.

24. The UE of claim 22, wherein the processing circuitry is further configured to:
  reset one or more radio link failure timers without resetting any radio link failure counters.

* * * * *

UNITED STATES PATENT AND TRADEMARK OFFICE
CERTIFICATE OF CORRECTION

PATENT NO. : 11,424,878 B2
APPLICATION NO. : 16/757966
DATED : August 23, 2022
INVENTOR(S) : Da Silva et al.

It is certified that error appears in the above-identified patent and that said Letters Patent is hereby corrected as shown below:

In the Specification

In Column 2, Line 9, delete "10 ns." and insert -- 10 ms. --, therefor.

In Column 2, Line 18, delete "DRX" and insert -- DRX, --, therefor.

In Columns 1 & 2, Line 57, delete "TimersAntiConstants" and insert -- TimersAndConstants --, therefor.

In Columns 3 & 4, Line 3, delete "rfl-TimersAndConstants" and insert -- rlf-TimersAndConstants --, therefor.

In Columns 3 & 4, Line 11, delete "rlf-TimersAndConsontsSCG" and insert -- rlf-TimersAndConstantsSCG --, therefor.

In Columns 3 & 4, Line 22, delete "radioResourceConfigDecliagedSCG" and insert -- radioResourceConfigDedicatedSCG --, therefor.

In Columns 3 & 4, Line 59, delete "maxim-um" and insert -- maximum --, therefor.

In Columns 3 & 4, Line 61, delete "2 >" and insert -- 2> --, therefor.

In Columns 3 & 4, Line 64, delete "VarRIF-Report" and insert -- VarRLF-Report --, therefor.

In Columns 3 & 4, Line 65, delete "3 >clear" and insert -- 3> clear --, therefor.

In Columns 5 & 6, in Table-continued, Line 11, delete "RIX" and insert -- RLC --, therefor.

In Column 5, Line 32, delete "RLF-TimersAndCOnstants" and insert -- RLF-TimersAndConstants --, therefor.

Signed and Sealed this
Fourth Day of April, 2023

Katherine Kelly Vidal
*Director of the United States Patent and Trademark Office*

CERTIFICATE OF CORRECTION (continued)
U.S. Pat. No. 11,424,878 B2

In Column 5, Line 39, delete "RLF-TitnersAndConstants-r9" and insert -- RLF-TimersAndConstants-r9 --, therefor.

In Column 5, Line 45, delete "ms100" and insert -- ms100, --, therefor.

In Column 5, Line 51, delete "ms2000," and insert -- ms20000, --, therefor.

In Column 5, Line 60, delete "ms3500, ms4000, ms5000, ms6000, ms8000, mslOOOO}," and insert --ms3500, ms4000, ms5000, ms6000, ms8000, ms10000}, ...,--, therefor.

In Column 5, Line 61, delete "{ms400," and insert -- {ms4000, --, therefor.

In Column 6, Lines 51-52, delete "RLF-TimersAndConstants" and insert -- RLF-TimersAndConstants IE. --, therefor.

In Column 7, Lines 26-27, delete "E-TRAN" and insert -- E-UTRAN --, therefor.

In Column 8, Line 19, delete "RRCConnectionReconfguration." and insert -- RRCConnectionReconfiguration, --, therefor.

In Column 10, Line 33, delete "N314:" and insert -- N314; --, therefor.

In Columns 9 & 10, Line 53, delete "while 1310" and insert -- while T310 --, therefor.

In Columns 9 & 10, Line 59, delete ""out-of-sync"" and insert -- "in-sync" --, therefor.

In Columns 9 & 10, Line 61, delete ""in-of-sync"" and insert -- "in-sync" --, therefor.

In Columns 9 & 10, Line 62, delete ""in-of-sync"" and insert -- "in-sync" --, therefor.

In Columns 9 & 10, Line 71, delete "its" and insert -- It's --, therefor.

In Columns 11 & 12, Line 5, delete "RTC" and insert -- RLC --, therefor.

In Columns 11 & 12, Line 8, delete "beam ,ktilure" and insert -- beam failure --, therefor.

In Columns 11 & 12, Line 9, delete "RLF" and insert -- RLF. --, therefor.

In Columns 11 & 12, Line 11, delete "RLE" and insert -- RLF --, therefor.

In Columns 11 & 12, Line 12, delete "activated;" and insert -- activated: --, therefor.

In Columns 11 & 12, Line 18, delete "x.x:x;" and insert -- x.x.x; --, therefor.

In Column 12, Line 38, delete "number" and insert -- number of --, therefor.

CERTIFICATE OF CORRECTION (continued)
U.S. Pat. No. 11,424,878 B2

In Column 12, Line 51, delete "EENUMERATED" and insert -- ENUMERATED --, therefor.

In Column 12, Line 59, delete "ms200 ms500, ms1000, rns2000," and insert -- ms200, ms500, ms1000, ms2000, --, therefor.

In Column 12, Line 64, delete "tns30000" and insert -- ms30000 --, therefor.

In Column 13, Line 38, delete "L" and insert -- L1 --, therefor.

In Column 13, Line 45, delete "305 A." and insert -- 305A, --, therefor.

In Column 14, Line 2, delete "RRCConnectionReconfguration" and insert -- RRCConnectionReconfiguration --, therefor.

In Column 14, Line 47, delete "NR" and insert -- NR, --, therefor.

In Column 14, Line 53, delete "SIB." and insert -- SIB1. --, therefor.

In Column 16, Line 61, delete "of;" and insert -- of: --, therefor.

In Column 16, Line 63, delete "timers: an evaluation period:" and insert -- timers; an evaluation period; --, therefor.

In Column 16, Line 65, delete "configuration: a hypothetical signal configuration," and insert -- configuration; a hypothetical signal configuration; --, therefor.

In Column 17, Line 5, delete "N310. N311, and N313." and insert -- N310, N311, and N313, --, therefor.

In Column 21, Line 6, delete "RLF:" and insert -- RLF; --, therefor.

In Column 21, Line 27, delete "embodiments:" and insert -- embodiments; --, therefor.

In Column 21, Lines 36-37, delete "embodiments:" and insert -- embodiments; --, therefor.

In Column 24, Line 15, delete "standards:" and insert -- standards; --, therefor.

In Column 24, Line 48, delete "stations." and insert -- stations, --, therefor.

In Column 25, Line 2, delete "O & M nodes," and insert -- O&M nodes, --, therefor.

In Column 26, Lines 22-39, delete "In certain embodiments, some......network generally." and insert the same at Column 26, Line 23, as a new paragraph.

In Column 31, Line 57, delete "source:" and insert -- source; --, therefor.

In Column 33, Line 10, delete "T310." and insert -- T310, --, therefor.

In Column 34, Line 29, delete "BWP." and insert -- BWP, --, therefor.

In Column 34, Line 47, delete "above." and insert -- above, --, therefor.

In Column 34, Line 64, delete "IE" and insert -- IE. --, therefor.

In Column 36, Line 31, delete "instance." and insert -- instance, --, therefor.

In Column 38, Line 31, delete "scenario." and insert -- scenario, --, therefor.

In Column 38, Line 38, delete "scenario." and insert -- scenario, --, therefor.

In Column 39, Line 57, delete "words." and insert -- words, --, therefor.

In Column 40, Line 5, delete "timer(s):" and insert -- timer(s); --, therefor.

In Column 40, Line 7, delete "event(s):" and insert -- event(s); --, therefor.

In Column 40, Line 15, delete "timer(s):" and insert -- timer(s); --, therefor.

In Column 40, Line 25, delete "timer(s):" and insert -- timer(s); --, therefor.

In Column 40, Line 35, delete "timer(s):" and insert -- timer(s); --, therefor.

In Column 40, Line 37, delete "event(s):" and insert -- event(s); --, therefor.

In Column 42, Line 6, delete "embodiments." and insert -- embodiments, --, therefor.

In Column 42, Line 13, delete "BWPs:" and insert -- BWPs; --, therefor.

In Column 59, Line 10, delete "ofNFV," and insert -- of NFV, --, therefor.

In Column 59, Line 39, delete "1312b." and insert -- 1312b, --, therefor.

In Column 59, Line 62, delete "network:" and insert -- network; --, therefor.

In Column 60 Lines 59-67 & Column 61 Lines 1-3, delete "Connection 1460 may be direct, or......external connection." and insert the same at Line 58, after "1410." as a continuation paragraph.

In Column 63, Lines 24-46, delete "Any......of the present disclosure.." and insert the same at Column 63, Line 25, as a new paragraph.
In Column 45, Lines 7-10, delete "At some extreme case, there......IS to stop RLF timer." and insert the same at Line 6, after "considered." as a continuation paragraph.

CERTIFICATE OF CORRECTION (continued)
U.S. Pat. No. 11,424,878 B2

In Column 45, Line 34, delete "RLM-RLF" and insert -- RLM/RLF --, therefor.

In Column 46, Line 58, delete "configuration:" and insert -- configuration; --, therefor.

In Column 47, Line 22, delete "part:" and insert -- part; --, therefor.

In Column 50, Line 42, delete "tasks" and insert -- tasks, --, therefor.

In Column 50, Line 64, delete "timers:" and insert -- timers; --, therefor.

In Column 50, Line 66, delete "configuration:" and insert -- configuration; --, therefor.